United States Patent
Sakamura et al.

(10) Patent No.: US 12,441,860 B2
(45) Date of Patent: Oct. 14, 2025

(54) POLYPROPYLENE-BASED RESIN EXPANDED BEAD, METHOD FOR PRODUCING SAME, AND MOLDED ARTICLE OF POLYPROPYLENE-BASED RESIN EXPANDED BEADS

(71) Applicant: JSP CORPORATION, Tokyo (JP)

(72) Inventors: Takumi Sakamura, Tochigi (JP); Hajime Ohta, Tochigi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 18/569,292

(22) PCT Filed: Jun. 17, 2022

(86) PCT No.: PCT/JP2022/024274
§ 371 (c)(1),
(2) Date: Dec. 12, 2023

(87) PCT Pub. No.: WO2022/270426
PCT Pub. Date: Dec. 29, 2022

(65) Prior Publication Data
US 2024/0279421 A1    Aug. 22, 2024

(30) Foreign Application Priority Data
Jun. 25, 2021  (JP) .................. 2021-105922

(51) Int. Cl.
*C08J 9/18*   (2006.01)
*B29B 9/12*   (2006.01)
(Continued)

(52) U.S. Cl.
CPC ............... *C08J 9/228* (2013.01); *B29B 9/12* (2013.01); *C08J 9/18* (2013.01); *B29K 2023/12* (2013.01);
(Continued)

(58) Field of Classification Search
CPC ....... C08J 9/06; C08J 9/16; C08J 9/18; B29K 2995/0063; B29K 2995/0082;
(Continued)

(56) References Cited

U.S. PATENT DOCUMENTS 7,678,839 B2   3/2010  Sasaki
8,518,540 B2   8/2013  Sakaguchi et al.
(Continued)

FOREIGN PATENT DOCUMENTS

EP   2 653 283 A1   10/2013
EP   3 309 197 A1    4/2018
(Continued)

OTHER PUBLICATIONS

Translation of JPH08108441A (Year: 1998).*
(Continued)

*Primary Examiner* — Hoa (Holly) Le
(74) *Attorney, Agent, or Firm* — Oblon, McClelland, Maier & Neustadt, L.L.P.

(57) ABSTRACT

A polypropylene-based resin expanded bead having a tubular shape with a through-hole, containing a foamed core layer constituted by a polypropylene-based resin and a fusion-bonding layer covering the foamed core layer. An average hole diameter d of the through-hole in the expanded bead is less than 1 mm, and a ratio d/D of the average hole diameter d to an average outer diameter D of the expanded bead is 0.4 or less, a mass ratio of the foamed core layer and the fusion-bondable layer is foamed core layer:fusion-bondable layer=99.5:0.5 to 85:15, and the polypropylene-based resin constituting the foamed core layer has a flexural modulus of 800 MPa or more and less than 1200 MPa and a melting point Tmc of 150° C. or lower.

10 Claims, 2 Drawing Sheets

(51) Int. Cl.
*C08J 9/228* (2006.01)
*B29K 23/00* (2006.01)
*B29K 105/04* (2006.01)

(52) U.S. Cl.
CPC .. *B29K 2105/046* (2013.01); *B29K 2105/048* (2013.01); *B29K 2995/0082* (2013.01); *C08J 2205/052* (2013.01); *C08J 2323/14* (2013.01)

(58) Field of Classification Search
CPC ....... B29K 2715/003; B29B 9/12; B29B 9/18; B29B 11/00; B29B 11/06; B29B 11/14
See application file for complete search history.

(56) References Cited

U.S. PATENT DOCUMENTS

| | | | |
|---|---|---|---|
| 8,592,495 | B2 | 11/2013 | Shima et al. |
| 9,611,369 | B2 | 4/2017 | Sato et al. |
| 10,882,970 | B2 | 1/2021 | Nakamoto |
| 11,732,101 | B2 * | 8/2023 | Shimada ............... B32B 1/00 428/36.5 |
| 2006/0223897 | A1 | 10/2006 | Sasaki |
| 2012/0100376 | A1 | 4/2012 | Sakaguchi et al. |
| 2012/0115968 | A1 | 5/2012 | Shima et al. |
| 2015/0057387 | A1 | 2/2015 | Sato et al. |
| 2017/0369669 | A1 * | 12/2017 | Yoshida ................. C08J 9/232 |
| 2018/0215891 | A1 * | 8/2018 | Kitahara .............. C08K 5/0066 |
| 2020/0032023 | A1 | 1/2020 | Nakamoto |
| 2020/0181351 | A1 | 6/2020 | Bailey et al. |
| 2022/0235216 | A1 | 7/2022 | Takagi et al. |
| 2023/0074915 | A1 * | 3/2023 | Shimada ................. C08J 9/18 |

FOREIGN PATENT DOCUMENTS

| | | | | |
|---|---|---|---|---|
| EP | 4 234 223 | A1 | 8/2023 | |
| JP | 08108441 | A * | 4/1996 | ........... B29C 67/205 |
| JP | H08108441 | A * | 9/1998 | |
| JP | 11-247322 | A | 9/1999 | |
| JP | 2000-129028 | A | 5/2000 | |
| JP | 2003-039565 | A | 2/2003 | |
| JP | 2006-307177 | A | 11/2006 | |
| JP | 2012-102201 | A | 5/2012 | |
| JP | 2014-040507 | A | 3/2014 | |
| JP | 2018-131620 | A | 8/2018 | |
| KR | 10-0226300 | B1 | 10/1999 | |
| KR | 10-2006-0105475 | A | 10/2006 | |
| KR | 10-2012-0058503 | A | 6/2012 | |
| KR | 10-2017-0105487 | A | 9/2017 | |
| TW | 201114816 | A | 5/2011 | |
| TW | 202106778 | A | 2/2021 | |
| WO | WO 2010/150466 | A1 | 12/2010 | |
| WO | WO 2013/137344 | A1 | 9/2013 | |
| WO | WO 2018/225649 | A1 | 12/2018 | |
| WO | WO 2020/235290 | A1 | 11/2020 | |
| WO | WO 2022/091750 | A1 | 5/2022 | |

OTHER PUBLICATIONS

Indonesian Office Action issued Feb. 24, 2025 in Indonesian Patent Application No. P00202400265 with English Machine translation, 6 pgs.
Extended European Search Report issued Sep. 3, 2024 in European Application No. 22828343.8, 7 pgs.
International Search Report issued Sep. 6, 2022 in PCT/JP2022/024274, filed on Jun. 17, 2022, 3 pages.
Notice of Reasons for Refusal issued in the corresponding Japanese Patent Application No. 2022-568982, 4 pages (with English Translation).
Decision to Grant issued in the corresponding Japanese Patent Application No. 2022-568982, 5 pages (with English Translation).
Written Opinion issued on Sep. 6, 2022 in PCT/JP2022/024274 (filed Jun. 17, 2022), 3 pgs.
Office Action received May 12, 2025, in Brazilian Patent Application No. BR112023026687-4 (with English translation).
Office Action received on Jul. 14, 2025, in corresponding Indonesian Patent Application No. P00202400265 with English translation.
Office Action received on Jul. 14, 2025, in corresponding Taiwanese Patent Application No. 111123389 (with English machine translation).
Office Action issued on Jul. 11, 2025 in Brazilian Patent Application No. BR112023026687-4 (with English machine translation).
Office Action issued on Aug. 19, 2025 in Korean Patent Application No. 10-2024-7002572 (with English machine translation), citing references 15-18.

* cited by examiner

POLYPROPYLENE-BASED RESIN EXPANDED BEAD, METHOD FOR PRODUCING SAME, AND MOLDED ARTICLE OF POLYPROPYLENE-BASED RESIN EXPANDED BEADS

CROSS REFERENCE TO RELATED APPLICATIONS

This application is a National Stage entry under 35 U.S.C. § 371 of PCT/JP2022/024274, filed on Jun. 17, 2022, and claims priority to Japanese Patent Application No. 2021-105922, filed on Jun. 25, 2021. The entire contents of both are incorporated herein by reference.

TECHNICAL FIELD

The present disclosure relates to a polypyrene-based resin expanded bead having a tubular shape with a through-hole, a method for producing the same, and a molded article of expanded beads obtained by in-mold molding of polypropylene-based resin expanded beads.

BACKGROUND ART

A molded article of polypropylene-based resin expanded beads is lightweight and excellent in cushioning property, rigidity and the like, and therefore is used for various applications such as packaging materials, containers, and cushioning materials. The molded article of polypropylene-based resin expanded beads is produced, for example, by an in-mold molding method in which polypropylene-based resin expanded beads are filled in a mold and heated with steam to secondarily expand the expanded beads, and at the same time, surfaces of the expanded beads are melted and fusion-bonded to each other to mold the expanded beads into a desired shape.

As described above, the molded article of expanded beads is produced by the in-mold molding of expanded beads, but the molded article of expanded beads immediately after the in-mold molding tends to swell due to secondary expansion. Therefore, in order to obtain a molded article of expanded beads having a desired shape, the molded article of expanded beads is usually cooled with water, air, or the like in a mold and then demolded.

When the molded article of expanded beads after the in-mold molding is stored at normal temperature, steam that has flowed into cells of the molded article of expanded beads during in-mold molding is condensed in the cells, inside of the cells has a negative pressure, volume shrinkage occurs in the molded article of expanded beads, and the molded article may be greatly deformed. Therefore, after releasing the molded article of expanded beads from the mold, an aging step, is usually required, of allowing the molded article of expanded beads to stand for a predetermined period of time under a high-temperature atmosphere adjusted to a temperature of, for example, about 60° C. to 80° C. to recover the shape of the molded article of expanded beads.

In the in-mold molding of the polypropylene-based resin expanded beads, since the aging step requires capital investment as well as time and effort for the step, omitting the aging step leads to a significant improvement in productivity of the molded article of expanded beads. For example, Patent Literature 1 discloses a technique for fusing expanded beads including an expanded layer and a fusion-bondable layer while maintaining voids between the beads, and Patent Literature 1 describes that the aging step can be omitted. In addition, Patent Literature 2 discloses a technique of in-mold molding of expanded beads using polypropylene-based resin prepared to have a melting point, a melt flow index, a Z average molecular weight, and the like in specific ranges, and according to Patent Literature 2, aging time can be shortened.

PRIOR ART LITERATURE

Patent Literature

Patent Literature 1: JP-A-2003-39565
Patent Literature 2: JP-A-2000-129028

SUMMARY OF INVENTION

Problems to be Solved by Invention

However, in the technique described in Patent Literature 1, although the aging step can be omitted, since a large number of voids are formed between the expanded beads of the molded article, appearance of the molded article of expanded beads is significantly poor, and the rigidity is insufficient depending on applications. In the technique described in the technique of Patent Literature 2, although the aging step can be shortened, the aging step is still required, and in a case of omitting the aging step, the molded article of expanded beads is significantly shrunk and deformed, and it is difficult to obtain the molded article of expanded beads having a desired shape.

In recent years, for example, in applications of members for automobiles, there is an increasing demand for polypropylene-based resin expanded beads containing polypropylene-based resin having a flexural modulus of 800 MPa or more and less than 1200 MPa as a base material resin. This is because such expanded beads are excellent in in-mold moldability, are also excellent in rigidity of the molded article of expanded beads, and are easy to adjust characteristics such as energy absorption performance to a desired range. However, in a case where a molded article of expanded beads having a low density is molded in a mold using expanded beads having polypropylene-based resin having the flexural modulus described above as the base material resin, when the aging step is omitted, the molded article of expanded beads is significantly shrunk and deformed, and it is difficult to obtain a molded article of expanded beads having a desired shape.

The present invention has been made in view of such a background, and an object of the present invention is to provide polypropylene-based resin expanded beads capable of obtaining the molded article of expanded beads that is lightweight, having a desired shape as well as excellent appearance and rigidity by the in-mold molding even when the aging step is omitted, and a method for producing the same. In addition, an object of the present invention is to provide a molded article of polypropylene-based resin expanded beads that is obtained by the in-mold molding the polypropylene-based resin expanded beads, is lightweight, and is excellent in appearance and rigidity.

Means for Solving Problem

One aspect of the present invention is a polypropylene-based resin expanded bead having a tubular shape with a through-hole, wherein an average hole diameter d of the through-hole in the expanded bead is less than 1 mm, and a ratio d/D of the average hole diameter d to an average outer diameter D of the expanded beads is 0.4 or less, the expanded bead has a foamed core layer constituted by a polypropylene-based resin and a fusion-bondable layer covering the foamed core layer, a mass ratio of the foamed core layer and the fusion-bondable layer is foamed core layer: fusion-bondable layer=99.5:0.5 to 85:15, and the polypropylene-based resin constituting the foamed core layer has a flexural modulus of 800 MPa or more and less than 1200 MPa and a melting point Tmc of 150° C. or lower.

Another aspect of the present invention is a molded article of polypropylene-based resin expanded beads formed by in-mold molding the polypropylene-based resin expanded beads according to any one of claims 1 to 8, wherein an open cell content of the molded article of expanded beads is 2.5% or more and 12% or less.

Still another aspect of the present invention is a method for producing a polypropylene-based resin expanded beads, comprising:
- a step of dispersing multilayer resin particles each having a tubular shape with a through-hole in a dispersion medium in a sealed container;
- a step of impregnating the multilayer resin particles dispersed in the dispersion medium with a blowing agent; and
- a step of producing expanded beads by expanding the multilayer resin particles containing the blowing agent, wherein
- the multilayer resin particles each have a core layer constituted by a polypropylene-based resin and a fusion-bondable layer covering the core layer,
- an average hole diameter dr of the through-holes in the multilayer resin particles is less than 0.25 mm, and a ratio dr/Dr of the average hole diameter dr to an average outer diameter Dr of the multilayer resin particles is 0.4 or less,
- a mass ratio of the core layer and the fusion-bondable layer in the multilayer resin particles is core layer: fusion-bondable layer=99.5:0.5 to 85:15, and
- the polypropylene-based resin constituting the core layer has a flexural modulus of 800 MPa or more and less than 1200 MPa, and a melting point Tmrc of 150° C. or lower.

Effects of Invention

According to the polypropylene-based resin expanded beads, the molded article of expanded beads that is lightweight, has a desired shape, and is excellent in appearance and rigidity can be produced by the in-mold molding even when the aging step is omitted. In addition, the polypropylene-based resin expanded beads can be molded at a wide molding heating temperature from a low temperature to a high temperature, and a molding cycle is short.

In addition, the molded article of polypropylene-based resin expanded beads is easily made lightweight, and is excellent in appearance and rigidity.

MODE FOR CARRYING OUT INVENTION

Figure 1:
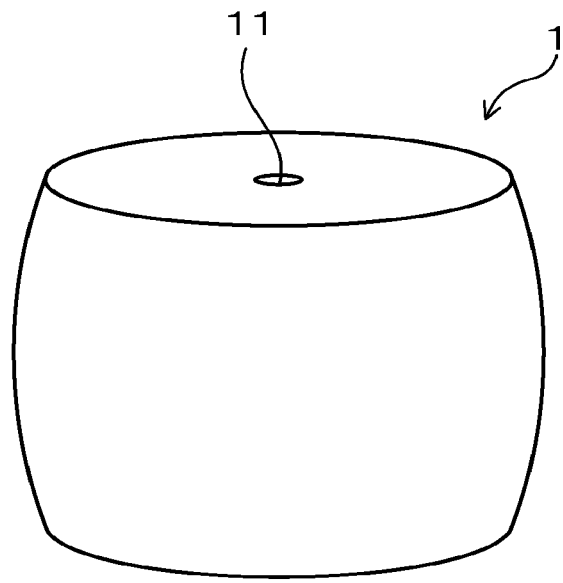
FIG. 1 is a schematic view of an appearance of expanded bead.

In the present description, "A to B" representing a numerical range has the same meaning as "A or more and B or less", and is used as including the values of A and B that are end points of the numerical range. In addition, in a case where a numerical value or a physical property value is expressed as a lower limit, it means that the numerical value or the physical property value is equal to or more than the numerical value or the physical property value, while in a case where a numerical value or a physical property value is expressed as an upper limit, it means that the numerical value or the physical property value is equal to or less than the numerical value or the physical property value. In addition, "% by weight" and "% by mass", and "parts by weight" and "parts by mass" are substantially synonymous, respectively. In addition, in the present description, the polypropylene-based resin expanded beads are appropriately referred to as "expanded beads", and the molded article of expanded beads is appropriately referred to as "molded article". Note that, the expanded beads each having the foamed core layer constituted by polypropylene-based resin are generally called polypropylene-based resin expanded beads.

The expanded beads can be used for producing the molded article of expanded beads. Specifically, the molded article can be produced by performing a molding step in which a large number of expanded beads are filled in a mold and a heating medium such as steam is supplied to fusion-bond the expanded beads to each other. In other words, the molded article can be obtained by the in-mold molding of the expanded beads.

The expanded beads each have a tubular shape with a through-hole. The average hole diameter d of the through-holes is less than 1 mm, and the ratio d/D of the average hole diameter d to the average outer diameter D of the expanded beads is 0.4 or less. The expanded beads each have a foamed core layer and a fusion-bondable layer, and a mass ratio of the foamed core layer and the fusion-bondable layer is foamed core layer:fusion-bondable layer=99.5:0.5 to 85:15. The polypropylene-based resin constituting the foamed core layer has a flexural modulus of 800 MPa or more and less than 1200 MPa, and a melting point Tmc of 150° C. or lower. By in-mold molding of such expanded beads, even in a case where a molded article having a low density is produced, the aging step can be omitted. In other words, even when the aging step of leaving the demolded molded article to stand for a predetermined period of time in a high-temperature atmosphere adjusted to a temperature of, for example, about 60° C. to 80° C. is omitted, the molded article of expanded beads that is lightweight, has a desired shape, and has excellent appearance and rigidity can be produced. In a case where the aging step is omitted, for example, the shape of the molded article can be stabilized by leaving the molded article after demolding to stand for 12 hours or more in an environment of 23° C. Note that, in the production method described above, pre-pressurization in which internal pressure is applied in advance to the expanded beads before being filled in the mold may be performed, or the pre-pressurization may not be performed. It is possible to produce the molded article of expanded beads that is lightweight, has a desired shape, and is excellent in appearance and rigidity, while omitting an aging step without performing the pre-pressurization. This is considered to be because the expanded beads have moderate secondary expandability. In addition, by using the expanded beads described above, the molding can be performed without the aging step, but the aging step can also be performed.

Figure 2:
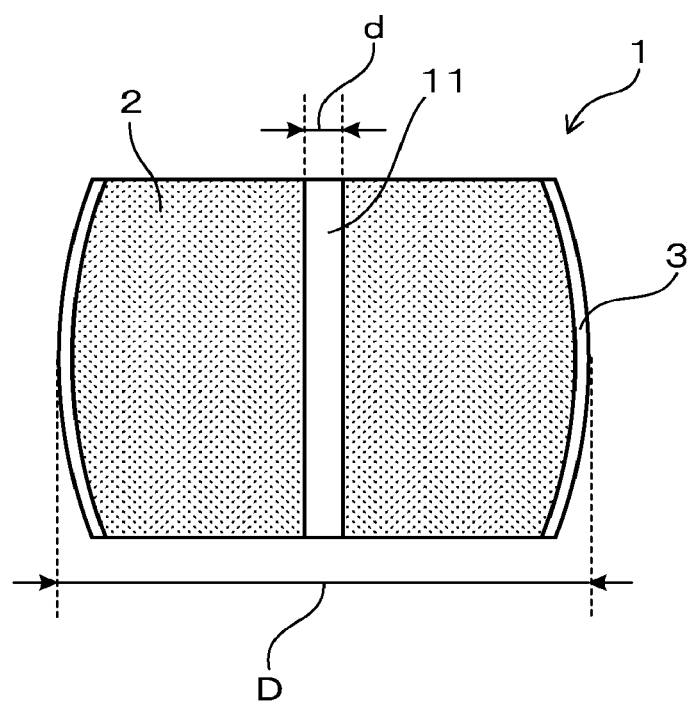
FIG. 2 is a schematic view of a cross-section of expanded bead in a direction parallel to a penetration direction of through-hole of the expanded bead.
Figure 3:
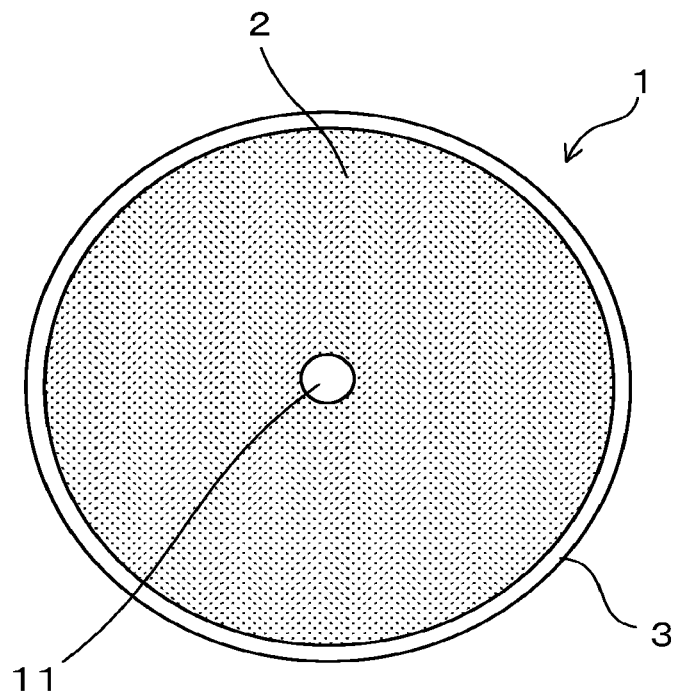
FIG. 3 is a schematic view of a cross-section of the expanded bead in the direction perpendicular to the penetration direction of through-hole of the expanded bead.

FIG. 1 to FIG. 3 show the expanded bead, but the present invention is not limited to these drawings. As shown in FIG. 1 and FIG. 2, an expanded bead 1 has a tubular shape and has a through-hole 11. The expanded bead 1 has a foamed core layer 2 and a fusion-bondable layer 3, and the fusion-bondable layer 3 covers the foamed core layer 2.

FIG. 3 shows the cross-section of the expanded bead 1 in a direction perpendicular to the penetration direction of the through-hole 11 (that is, the direction orthogonal to the penetration direction). In this cross-section of the expanded bead 1, a circularity of the through-hole 11 is preferably 0.90 or more. In this case, since the through-hole is less likely to be crushed by compression from each direction, adjustment of the open cell content of the molded article to be described later becomes easier, and compression physical properties of the molded article are further improved. In addition, it is possible to obtain an effect of preventing variations in physical properties of the molded article. From a viewpoint of further improving these effects, the circularity of the through-hole is more preferably 0.92 or more, and still more preferably 0.95 or more. The circularity of the through-hole can be adjusted to fall within the range above by, for example, changing the shape of the die for forming the through-hole, or adjusting water temperature when cooling a strand, which is usually performed at a water temperature of about 25° C., to a low temperature (for example, 15° C. or lower). An upper limit of the circularity of the through-hole is 1. In the expanded beads of the present disclosure, as to be described later, the average hole diameter d of the through-holes is less than 1 mm. In such expanded beads having a small average hole diameter d, the through-holes are easily crushed during production, and the circularity tends to be small, but according to the above method, expanded beads having a high circularity can be obtained.

The circularity of the through-holes is measured and calculated as follows. 50 or more expanded beads randomly selected from the expanded bead group are cut perpendicularly to the penetration direction of the through-holes at a position where the area of a cut section is maximized. The cut section of each expanded bead is photographed, and a cross-sectional area S (specifically, an opening area) and a peripheral length C (that is, a circumferential length of an opening part) of a through-hole portion are obtained. The circularity can be obtained by the following formula (a).

$$\text{Circularity} = 4\pi S/(C \times C) \quad (a)$$

Here, $\pi$ means the circular constant.

Note that, even in a case where a size of the through-hole of each expanded bead is not uniform in a through-hole diameter in the penetration direction, the circularity of the through-hole of each expanded bead is determined by the circularity of the through-hole at the position where the area of the cut section of the expanded bead is maximized as described above.

As described above, since the expanded beads each have the through-hole, the molding can be performed at a lower molding heating temperature (that is, with low molding pressure). This is considered to be because the average hole diameter d of the through-holes and the ratio d/D of the average hole diameter d to the average outer diameter D of the expanded beads are in a relatively small range, and thus the expanded beads have appropriate secondary expandability. In addition, in the molding step, the heating medium such as steam is introduced into the sealed container filled with expanded beads to thereby fusion-bond the expanded beads with each other while secondarily expanding the same. In this regard, that is considered to be because the expanded beads having a through-hole allow the heating medium to pass through the through-hole, so that the expanded beads are heated from inside and outside to thereby increase the secondary expandability. Furthermore, since the molding can be performed at a low temperature, deformation and significant shrinkage of the molded article are prevented after the in-mold molding, and the molded article having a desired shape is easily obtained even when the aging step is omitted. In addition, in spite of the moderate secondary expandability, since the through-holes are provided and the secondary expandability is not excessively increased, water cooling time in in-mold molding is shortened, and productivity is improved.

The tubular expanded beads each having a through-hole preferably have at least one cylindrical hole penetrating in an axial direction of the columnar expanded beads such as a cylinder and a prism. The expanded beads are, for example, cylinder, and more preferably have a cylindrical hole penetrating in the axial direction thereof.

In a case where the expanded beads do not have the through-holes, it may be difficult to mold the molded article at a low molding heating temperature. In addition, in a case of omitting the aging step, there is a possibility that significant shrinkage and deformation of the molded article cannot be prevented. On the other hand, even in a case where the expanded beads have the through-holes, when the average hole diameter d is too large, the appearance and rigidity may be deteriorated. In addition, in this case, the secondary expandability may be deteriorated, and a moldable range may be narrowed. From this viewpoint, the average hole diameter d of the expanded beads is less than 1 mm as described above. The average hole diameter d of the expanded beads is preferably 0.95 mm or less, more preferably 0.92 mm or less, and still more preferably 0.90 mm or less from a viewpoint of obtaining the molded article having a desired shape and obtaining the molded article more excellent in appearance and rigidity even when the aging step is omitted. Note that, a lower limit of the average hole diameter d of the expanded beads is preferably 0.2 mm or more, and more preferably 0.4 mm or more from a viewpoint of ease of production and a viewpoint of facilitating adjustment of the open cell content of the molded article to be described later.

The average hole diameter d of the expanded beads can be adjusted not only by adjusting a hole diameter dr of the through-holes in the resin particles to be described later but also by adjusting the apparent density and the heat of high-temperature peak of the expanded beads. In addition, the average hole diameter d can be more easily adjusted to a small value by forming the expanded beads into second-step expanded beads produced by two-step expansion method.

The reason why the expanded beads having the through-holes of less than 1 mm easily prevent the significant shrinkage and deformation of the molded article in a case of omitting the aging step is not clear, but it is considered as follows. As will be described later, the molded article obtained by the in-mold molding of the expanded beads has a minute open cell structure in communication derived from the through-holes or the like of the expanded beads. Therefore, this is considered to be because, air quickly flows into the cells in the molded article after the demolding, and the internal pressure of the entire molded article increases, so that dimensions of the molded article easily stabilize at an early stage. From this, in a case where the expanded beads have no through-holes, it is considered that the significant shrinkage and deformation of the molded article cannot be prevented in a case of omitting the aging step.

The average hole diameter d of the through-holes of the expanded beads is obtained as follows. 50 or more expanded beads randomly selected from the expanded bead group are cut perpendicularly to the penetration direction of the through-holes at a position where the area of a cut section is maximized. The cut section of each expanded bead is photographed, a cross-sectional area (specifically, an opening area) of the through-hole portions is obtained, the diameter of a virtual perfect circle having the same area as the area of the cross-sectional area of the through-hole portions is calculated, and the arithmetic average value thereof is taken as the average hole diameter d of the through-holes of the expanded beads. Note that, even when the size of the through-holes of each expanded bead is not uniform in a through-hole diameter in the penetration direction, the through-hole diameter of each expanded bead is determined by the hole diameter at a position where the area of the cut section of the expanded bead is maximized as described above.

The average outer diameter D of the expanded beads is preferably 2 mm or more, more preferably 2.5 mm or more, and still more preferably 3 mm or more from a viewpoint that a wall thickness of the tubular expanded beads increases and secondary expandability of the expanded beads and the rigidity of the molded article are improved. On the other hand, the thickness is preferably 5 mm or less, more preferably 4.5 mm or less, and still more preferably 4.3 mm or less from a viewpoint of improving filling property into the mold during the molding.

The ratio d/D of the average hole diameter d to the average outer diameter D of the expanded beads is 0.4 or less. In a case where the ratio d/D exceeds 0.4, the appearance of the molded article may be deteriorated and the rigidity may be deteriorated. In addition, in this case, the secondary expandability of the expanded beads during the in-mold molding is lowered, and the moldable range may be narrowed. From such a viewpoint of improving the appearance of the molded article, from a viewpoint of further improving the rigidity, and from a viewpoint of further improving the secondary expandability, the d/D is preferably 0.35 or less, more preferably 0.3 or less, and still more preferably 0.25 or less. Note that, the ratio d/D is preferably 0.1 or more from a viewpoint of easier adjustment of the open cell content of the molded article to be described later and a viewpoint of ease of production of the expanded beads.

The average outer diameter D of the expanded beads is obtained as follows. 50 or more expanded beads randomly selected from the expanded bead group are cut perpendicularly to the penetration direction of the through-holes at a position where the area of a cut section is maximized. The cut section of each expanded bead is photographed, the cross-sectional area (specifically, the cross-sectional area also includes an opening portion of the through-holes is) of the expanded bead is obtained, the diameter of the virtual perfect circle having the same area as the area of the cross-sectional area of the expanded bead is calculated, and the arithmetic average value thereof is taken as the average outer diameter D of the expanded bead. Note that, even when the outer diameter of each expanded bead is not uniform in the penetration direction, the outer diameter of each expanded bead is determined by the outer diameter at the position where the area of the cut section of the expanded bead in the direction perpendicular to the penetration direction is maximized as described above.

The average value of the wall thickness t of the tubular expanded beads is preferably 1.2 mm or more and 2 mm or less. When the average value of the wall thickness t is within this range, the wall thickness of the expanded beads is sufficiently thick, so that the secondary expandability during the in-mold molding is further improved. In addition, the expanded beads are more difficultly crushed against an external force, and the rigidity of the molded article is further improved. From such a viewpoint, an average wall thickness t of the expanded beads is more preferably 1.3 mm or more, and still more preferably 1.5 mm or more.

The average wall thickness t of the expanded bead is a distance from the surfaces (that is, outer surfaces) of the expanded beads to outer peripheries (that is, inner surfaces of the expanded beads) of the through-holes, and is a value obtained by the following formula (I).

$$t = (D - d)/2 \qquad (I)$$

d: average hole diameter (mm) of through-holes
D: average outer diameter (mm) of expanded beads In addition, the ratio t/D of the average wall thickness t to the average outer diameter D of the expanded beads is preferably 0.35 or more and 0.5 or less. When t/D is within the range above, the filling property of the expanded beads is further improved in the in-mold molding of the expanded beads. In addition, the secondary expandability can be further enhanced while maintaining the water cooling time short. Therefore, a molded article excellent in appearance and rigidity can be produced with high productivity at a lower molding heating temperature.

The foamed core layer of the expanded beads is constituted by polypropylene-based resin. In the present description, the polypropylene-based resin refers to a homopolymer of a propylene monomer and a propylene-based copolymer containing 50% by mass or more of a propylene-derived structural unit. The polypropylene-based resin is preferably a propylene-based copolymer obtained by copolymerizing propylene with another monomer. Preferable examples of the propylene-based copolymer include copolymers of propylene and an α-olefin having 4 to 10 carbon atoms, such as an ethylene-propylene copolymer, a butene-propylene copolymer, a hexene-propylene copolymer, and an ethylene-propylene-butene copolymer. These copolymers are, for example, random copolymers, block copolymers, and the like, and are preferably random copolymers. In addition, the polypropylene-based resin may contain a plurality of kinds of polypropylene-based resins.

The polypropylene-based resin is preferably resin polymerized by a Ziegler-Natta-based polymerization catalyst. In this case, the secondary expandability of the expanded beads is improved. This is considered to be because the polypropylene-based resin obtained by the Ziegler-Natta-based polymerization catalyst tends to have a wider molecular weight distribution than polypropylene-based resin obtained by, for example, a metallocene-based polymerization catalyst.

The polypropylene-based resin constituting the foamed core layer may contain a polymer other than the polypropylene-based resin as long as the purpose and effect of the present disclosure are not impaired. Examples of the other polymer include elastomers or thermoplastic resin other than the polypropylene-based resin such as polyethylene-based resin and polystyrene-based resin. A content of the other polymer in the polypropylene-based resin constituting the foamed core layer is preferably 20% by mass or less, more preferably 10% by mass or less, still more preferably 5% by mass or less, and 0, that is, it is particularly preferable that the foamed core layer substantially contains only the polypropylene-based resin as the polymer.

The polypropylene-based resin constituting the foamed core layer is preferably an ethylene-propylene random copolymer, and a content of an ethylene component in the copolymer is preferably more than 2.0% by mass and 5.0% by mass or less. Note that, a total of the ethylene component and a propylene component in the ethylene-propylene random copolymer is 100% by mass. In this case, it is possible to mold a good molded article having sufficient rigidity at a lower molding heating temperature (that is, with low molding pressure). From a viewpoint of further improving this effect, the content of the ethylene component in the copolymer is more preferably 2.5% by mass or more and 4.0% by mass or less, and still more preferably 2.8% by mass or more and 3.5% by mass or less. Note that, a content of a monomer component in the copolymer can be obtained by IR spectrum measurement. The ethylene component and the propylene component of the ethylene-propylene copolymer mean a structural unit derived from ethylene and a structural unit derived from propylene in the ethylene-propylene copolymer, respectively. In addition, the content of each monomer component in the copolymer means the content of a structural unit derived from each monomer in the copolymer.

The polypropylene-based resin constituting the foamed core layer has a melting point Tmc of 150° C. or lower. In a case where the melting point Tmc exceeds 150° C., a higher molding temperature (that is, high molding pressure) may be required in order to mold a good molded article of expanded beads excellent in appearance and rigidity. From a viewpoint that a good molded article can be molded at a lower pressure, the melting point Tmc of the polypropylene-based resin constituting the foamed core layer is preferably 148° C. or lower, and more preferably 145° C. or lower. On the other hand, from a viewpoint of further enhancing the heat resistance, mechanical strength, and the like of the molded article of expanded beads, the melting point Tmc of the polypropylene-based resin constituting the foamed core layer is preferably 135° C. or higher, more preferably 138° C. or higher, and still more preferably 140° C. or higher.

The melting point of the polypropylene resin is obtained based on JIS K7121:1987. Specifically, "(2) The case of measurement of melting temperature after a definite heat treatment" is adopted as a state adjustment, a DSC curve is obtained by raising temperature of a test piece subjected to the state adjustment from 30° C. to 200° C. at a heating rate of 10° C./min, and a vertex temperature of the melting peak is set as the melting point. Note that, when a plurality of melting peaks appears in the DSC curve, the vertex temperature of the melting peak having a largest area is taken as the melting point.

In addition, the foamed core layer may be constituted by a polypropylene-based resin composition containing at least two polypropylene-based resins having different melting points and having a flexural modulus of 800 MPa or more and less than 1200 MPa. Specifically, the polypropylene-based resin composition is preferably constituted by a polypropylene-based resin composition containing 70 to 97% by weight of a first polypropylene-based resin having a melting point of more than 140° C. and 150° C. or lower and 3 to 30% by weight of a second polypropylene-based resin having a melting point of more than 145° C. and 160° C. or lower (with the proviso that, a total of the first polypropylene-based resin and the second polypropylene-based resin is 100% by weight). In this case, it is possible to obtain an effect of more reliably enhancing the dimensional stability of, for example, a molded article having an uneven thickness, that is, including a thick portion having a large thickness and a thin portion having a small thickness when such a molded article is molded omitting the aging step while maintaining a low molding heating temperature. From a viewpoint of improving this effect, it is more preferable that a content of the first polypropylene-based resin is 75 to 95% by weight and a content of the second polypropylene-based resin is 5 to 25% by weight (however, the total of the first polypropylene-based resin and the second polypropylene-based resin is 100% by weight), and it is still more preferable that the content of the first polypropylene-based resin is 80 to 90% by weight and the content of the second polypropylene-based resin is 10 to 20% by weight (with the proviso that, the total of the first polypropylene-based resin and the second polypropylene-based resin is 100% by weight). In addition, from the same viewpoint, the melting point of the first polypropylene-based resin is more preferably higher than 140° C. and 145° C. or lower, and the melting point of the second polypropylene-based resin is more than 145° C. and 155° C. or lower. Note that, a method for measuring the melting point of the polypropylene-based resin composition is the same as the flexural modulus of the polypropylene-based resin described above. In addition, the method for measuring the flexural modulus of the polypropylene-based resin composition is the same as the flexural modulus of the polypropylene-based resin to be described later.

In addition, from a viewpoint of further improving the above effect, a difference (that is, $Tmc_2-Tmc_1$) between a melting point $Tmc_2$ of the second polypropylene-based resin and a melting point $Tmc_1$ of the first polypropylene-based resin is preferably 5° C. or more and less than 15° C., and more preferably 8° C. or more and 13° C. or lower.

From a viewpoint of further enhancing the expandability and moldability, the melt mass flow rate (that is, the MFR) of the polypropylene-based resin constituting the foamed core layer is preferably 5 g/10 min or more, more preferably 6 g/10 min or more, and still more preferably 7 g/10 min or more. On the other hand, from a viewpoint of further enhancing the rigidity of the molded article, the MFR is preferably 12 g/10 min or less, and more preferably 10 g/10 min or less. Note that, the MFR of the polypropylene-based resin is a value measured under the conditions of a test temperature of 230° C. and a load of 2.16 kg based on JIS K7210-1:2014.

The flexural modulus of the polypropylene-based resin constituting the foamed core layer is 800 MPa or more and less than 1200 MPa. In a case where the flexural modulus of the polypropylene-based resin constituting the foamed core layer is less than 800 MPa, the shrinkage and deformation easily occur in the molded article after the in-mold molding, and in addition, a degree thereof increases, so that it is difficult to omit the aging step for eliminating the significant shrinkage and deformation. From a viewpoint of further preventing the significant shrinkage and deformation, the flexural modulus of the polypropylene-based resin is preferably 850 MPa or more, and more preferably 900 MPa or more. On the other hand, in a case where the flexural modulus of the polypropylene-based resin constituting the foamed core layer is 1200 MPa or more, it is necessary to increase the molding temperature (that is, the molding pressure) in order to sufficiently enhance fusion-bondability between the expanded beads in the molded article. In addition, there is a case where there is room for improvement in energy absorption performance depending on the applications. From the above viewpoint, the flexural modulus of the polypropylene-based resin is preferably 1100 MPa or less, and more preferably 1000 MPa or less. Note that, the flexural modulus of the polypropylene resin can be obtained based on JIS K7171:2008.

From the viewpoint of improving the moldability of the expanded beads, the rigidity of the molded article, and the like, a closed cell content of the expanded beads is preferably 90% or more, more preferably 92% or more, and still more preferably 95% or more.

The closed cell content of the expanded beads can be measured using an air-comparison pycnometer based on ASTM-D2856-70 Procedure C. Specifically, measurement is performed as follows. Using expanded beads having a bulk volume of about 20 cm³ after the state adjustment as a measurement sample, an apparent volume Va was accurately measured by an ethanol immersion method as to be described below. After the measurement sample whose apparent volume Va has been measured is sufficiently dried, a true volume value Vx of the measurement sample measured by AccuPyc II 1340 manufactured by Shimadzu Corporation is measured in accordance with Procedure C described in ASTM-D2856-70. Then, based on these volume values Va and Vx, the closed cell content is calculated by the following formula (II), and an average value of the five samples (N=5) is taken as the closed cell content of the expanded beads.

$$\text{Closed cell content (\%)} = (Vx - W/\rho) \times 100/(Va - W/\rho) \qquad \text{(II)}$$

Provided that

Vx: the true volume of the expanded beads measured by the above method, that is, a sum of the volume of the resin constituting the expanded beads and a total volume of the closed cell portion in the expanded beads (unit: cm³), Va: the apparent volume (unit: cm³) of expanded beads measured from an increase in water level when expanded beads are immersed in a measuring cylinder containing ethanol, W: weight of the measurement sample for expanded beads (unit: g), and $\rho$: density of resin constituting expanded beads (unit: g/cm³).

The expanded bead 1 have the fusion-bondable layer 3 covering the foamed core layer 2. The fusion-bondable layer 3 is a layer covering the whole or a part of the foamed core layer 2 (see FIG. 1 to FIG. 3). The expanded bead 1 includes, for example, a cylindrical foamed core layer 2 having the through-hole and a tubular fusion-bondable layer 3 covering the foamed core layer, and have, for example, a so-called core-sheath structure. The fusion-bondable layer 3 means a layer, that enables the in-mold molding of the molded article of expanded beads in which expanded beads are well fusion-bonded to each other at a steam pressure lower than the lowest steam pressure at which the molded article of expanded beads (that is, a good single layer molded article of expanded beads) in which single layer expanded beads are well fusion-bonded to each other, is obtained in a case where the expanded beads (that is, the single layer expanded beads) having a foamed core layer single layered without the fusion-bondable layer are in-mold molded. Note that, the expanded bead molded article in which the expanded beads are well fusion-bonded with each other means that a value of a fusion rate of the molded article is 90% or more. The fusion rate of the molded article is measured as a material fracture rate represented by a ratio (%) of the number of broken expanded beads to the number of expanded beads present on a broken surface obtained by bending and breaking the molded article, and obtaining the number of expanded beads present on the broken surface and the number of broken expanded beads. Note that, it can also be said that the fusion-bondable layer 3 is constituted by resin which is easily fusion-bonded to each other at a lower temperature (specifically, a low vapor pressure) than resin constituting the foamed core layer 2. Examples of the resin constituting the fusion-bondable layer include resin having a melting point lower than that of the resin constituting the foamed core layer and resin having a low softening point.

In a case where the expanded beads have no fusion-bondable layer, a higher molding temperature (that is, high molding pressure) is required in order to mold a good molded article of expanded beads excellent in appearance and rigidity. In this case, it may be difficult to prevent the significant shrinkage and deformation of the molded article in a non-aging molding.

The reason why the expanded beads have the fusion-bondable layer, and thus it is easy to prevent the significant shrinkage and deformation in a case of omitting the aging step, is not clear, but it is considered that by molding at a low molding heating temperature, heat received by the expanded beads by the heating medium such as steam in the in-mold molding can be further prevented, and a dimensional change due to thermal shrinkage of the molded article is more easily prevented.

The fusion-bondable layer is constituted by, for example, polyolefin-based resin. Examples of the polyolefin-based resin include the polyethylene-based resin, the polypropylene-based resin, and the polybutene-based resin. From a viewpoint of adhesiveness to the foamed core layer, the polyolefin-based resin is preferably the polyethylene-based resin or the polypropylene-based resin, and more preferably the polypropylene-based resin. Examples of the polypropylene-based resin include an ethylene-propylene copolymer, an ethylene-butene copolymer, an ethylene-propylene-butene copolymer, a propylene homopolymer, and the like, and among them, the ethylene-propylene copolymer or the ethylene-propylene-butene copolymer is preferable. Examples of the polyethylene-based resin include linear low density polyethylene, low density polyethylene, high density polyethylene, and the like, and among them, linear low density polyethylene is preferable.

A melting point Tms of the polyolefin-based resin constituting the fusion-bondable layer is preferably lower than the melting point Tmc of the polypropylene-based resin constituting the foamed core layer, for example. In other words, for example, Tms<Tmc is preferable. In this case, the fusion-bondability between the expanded beads during the molding is improved, and molding at a lower temperature (specifically, low pressure) becomes possible. In addition, the significant shrinkage and deformation in a case where the aging step is omitted are more easily prevented. From a viewpoint of further improving these effects, Tmc−Tms≥5 is preferable, Tmc−Tms≥6 is more preferable, and Tmc−Tms≥8 is still more preferable. From a viewpoint of preventing peeling between the foamed core layer and the fusion-bondable layer, mutual adhesion between the expanded beads, and the like, Tmc−Tms≤35 is preferable, Tmc−Tms≤20 is more preferable, and Tmc−Tms≤15 is still more preferable.

From a viewpoint of further enhancing the fusion-bondability of the expanded beads during the molding, the melting point Tms of the polyolefin-based resin constituting the fusion-bondable layer is preferably 120° C. or more and 145° C. or lower, and more preferably 125° C. or more and 140° C. or lower. The melting point of the polyolefin-based resin constituting the fusion-bondable layer is obtained based on JIS K7121:1987. Specifically, it is obtained by the same conditions and methods as those for the polypropylene-based resin constituting the foamed core layer described above.

From a viewpoint of reliably preventing the peeling between the foamed core layer and the fusion-bondable layer, the MFR of the polyolefin-based resin constituting the fusion-bondable layer is preferably about the same as the MFR of the polypropylene-based resin constituting the foamed core layer, and specifically, it is preferably 2 to 15 g/10 min, more preferably 3 to 12 g/10 min, and still more preferably 4 to 10 g/10 min. Note that, in a case where the polyolefin-based resin is polypropylene-based resin, the MFR is a value measured under conditions of the test temperature of 230° C. and the load of 2.16 kg in accordance with JIS K7210-1:2014, and in a case where the polyolefin-based resin is the polyethylene-based resin, the MFR is a value measured under conditions of a test temperature of 190° C. and the load of 2.16 kg in accordance with JIS K7210-1:2014.

The expanded beads are beads having a multilayer structure including the foamed core layer and the fusion-bondable layer covering the foamed core layer. The foamed core layer is constituted by foamed polypropylene-based resin, and the fusion-bondable layer is constituted by polyolefin-based resin in a foamed or non-foamed state. The fusion-bondable layer is preferably in substantially the non-foamed state. The term "substantially the non-foamed state" includes a state in which the fusion-bondable layer is not foamed and the cells are not contained and a state in which the cells disappear after expanding, and means that there is almost no cell structure. A thickness of the fusion-bondable layer is, for example, 0.5 to 50 μm. In addition, an intermediate layer may be further provided between the foamed core layer and the fusion-bondable layer, but it is preferable to have no intermediate layer.

The mass ratio of the foamed core layer and the fusion-bondable layer in the expanded beads is foamed core layer: fusion-bondable layer=99.5:0.5 to 85:15. In other words, the mass ratio of the fusion-bondable layer to a total mass of the foamed core layer and the fusion-bondable layer (that is, the total mass of the expanded beads) is 0.5 to 15. In a case where the mass ratio of the fusion-bondable layer is less than 0.5, the molding pressure reducing effect by the fusion-bondable layer is not sufficiently exhibited, and there is a possibility that the significant shrinkage and deformation cannot be prevented in a case of omitting the aging step. From a viewpoint that the shrinkage and deformation can be prevented even when the aging step is omitted, the mass ratio of the fusion-bondable layer is preferably 1 or more, and more preferably 3 or more. On the other hand, in a case where the mass ratio exceeds 15, it is difficult to prevent the significant shrinkage and deformation of the molded article in the non-aging molding particularly in a case of trying to produce a molded article having a small apparent density. In other words, the aging step is required. From a viewpoint of further preventing the significant shrinkage and deformation of the molded article after the in-mold molding, the mass ratio of the fusion-bondable layer is preferably 12 or less, and more preferably 10 or less. The mass ratio between the foamed core layer and the fusion-bondable layer in the expanded beads corresponds to the mass ratio between the core layer and the fusion-bondable layer in the multilayer resin particles to be described later.

As described above, the reason why the shrinkage and deformation of the molded article can be easily prevented by adjusting the mass ratio of the fusion-bondable layer even in a case of omitting the aging step is considered as follows. In order to realize the lightweight of the molded article, expanded beads having a small apparent density are usually used for the in-mold molding, but the fusion-bondable layer of the expanded beads is usually constituted by, for example, substantially non-foamed resin. Therefore, in a case where the mass ratio of the fusion-bondable layer is large, it is necessary to further reduce the apparent density of the foamed core layer in order to reduce the apparent density of the entire expanded beads. As a result, it is considered that a resistance against contraction and deformation of the molded article after the demolding is likely to decrease. In addition, the fusion-bondable layer is usually constituted by resin having a lower melting point or softening point than the resin constituting the foamed core layer. Therefore, it is considered that in a case where the mass ratio of the fusion-bondable layer is large, the fusion-bondable layer is easily affected by heat due to the steam during the in-mold molding, and the entire expanded beads are easily shrunk.

From the above, in a case where the mass ratio of the fusion-bondable layer is too large, it is considered that it is difficult to prevent the significant shrinkage and deformation of the molded article in the non-aging molding particularly in a case of trying to produce the molded article having the small apparent density.

From a viewpoint of balance between lightweight property and rigidity of the molded article, and because the significant deformation and shrinkage of the molded article can be more sufficiently prevented even when the aging step is omitted, the apparent density of the expanded beads is preferably 10 kg/m$^3$ or more and 100 kg/m$^3$ or less, more preferably 15 kg/m$^3$ or more and 45 kg/m$^3$ or less, still more preferably 20 kg/m$^3$ or more and 40 kg/m$^3$ or less, and particularly preferably 25 kg/m$^3$ or more and 38 kg/m$^3$ or less. Conventionally, in a case of producing the molded article having the low density by reducing the apparent density of expanded beads, it has been difficult to omit the aging step because the molded article is significantly easily deformed after the demolding. On the other hand, according to the expanded beads in the present disclosure, the aging step can be omitted even in a case where the apparent density is small, and the molded article having a desired shape and excellent appearance and rigidity can be produced even without aging.

The apparent density of the expanded beads can be obtained by immersing the expanded bead group (weight W (g) of the expanded bead group) left for 1 day under conditions of a relative humidity of 50%, 23° C., and 1 atm in the measuring cylinder containing alcohol (for example, ethanol) at 23° C. using a wire mesh or the like, obtaining a volume V (L) of the expanded bead group from an increase in the water level, dividing the weight of the expanded bead group by a volume of the expanded bead group (W/V), and converting the unit into [kg/m$^3$].

From a viewpoint of further preventing the significant shrinkage and deformation of the molded article in the case of omitting the aging step, the ratio of the apparent density of the expanded beads to a bulk density of the expanded beads (that is, apparent density/bulk density) is preferably 1.7 or more, and more preferably 1.75 or more. On the other hand, from a viewpoint of further enhancing the secondary expandability of the expanded beads, from a viewpoint of further enhancing the rigidity of the molded article, and from a viewpoint of further improving the appearance, the apparent density/bulk density is preferably 2.3 or less, more preferably 2.1 or less, and still more preferably 1.9 or less.

The bulk density of the expanded beads is obtained as follows. The expanded beads are randomly taken out from the expanded bead group and placed in the measuring cylinder with a volume of 1 L, a large number of the expanded beads are accommodated up to a scale of 1 L so as to be in a natural deposition state, a mass W2 [g] of the accommodated expanded beads is divided by an accommodation volume V2 (1 L) (W2/V2), and the unit is converted to [kg/m$^3$], whereby the bulk density of the expanded beads is obtained.

The expanded beads preferably have a crystal structure in which an endothermic peak (that is, a resin-intrinsic peak) due to melting inherent to the polypropylene-based resin and one or more melting peaks (that is, the high-temperature peak) appear on a high temperature side thereof in a DSC curve obtained when heated from 23° C. to 200° C. at a heating rate of 10° C./min. The DSC curve is obtained by differential scanning calorimetry (DSC) in accordance with JIS K7121:1987, using 1 to 3 mg of expanded beads as a test sample.

The resin-intrinsic peak is an endothermic peak due to melting intrinsic to the polypropylene-based resin constituting the expanded beads, and is due to endotherm during melting of crystals inherent in the polypropylene-based resin. On the other hand, the endothermic peak on the high temperature side of the resin-intrinsic peak (that is, the high-temperature peak) is an endothermic peak appearing on a higher-temperature side than the resin-intrinsic peak in the DSC curve. When this high-temperature peak appears, it is presumed that secondary crystals are present in the resin. Note that, as described above, in the DSC curve obtained when heating from 23° C. to 200° C. (that is, a first heating) is performed at the heating rate of 10° C./min, then cooling from 200° C. to 23° C. is performed at a cooling rate of 10° C./min, and heating from 23° C. to 200° C. (that is, a second heating) is performed again at the heating rate of 10° C./min, since only the endothermic peak due to the melting inherent in the polypropylene-based resin constituting the expanded beads is observed, the resin-intrinsic peak and the high-temperature peak can be distinguished. The vertex temperature of the resin-intrinsic peak may be slightly different between the first heating and the second heating, but a difference is usually within 5° C.

Heat of fusion of the high-temperature peak of the expanded beads is preferably 5 to 40 J/g, more preferably 7 to 30 J/g, and still more preferably 10 to 20 J/g from a viewpoint of further improving the moldability of the expanded beads and from a viewpoint of obtaining a molded article having better rigidity.

In addition, the ratio of the heat of fusion of the high-temperature peak to the heat of fusion of all melting peaks of the DSC curve (the heat of fusion of the high-temperature peak/the heat of fusion of all melting peaks) is preferably 0.05 to 0.3, more preferably 0.1 to 0.25, and still more preferably 0.15 to 0.2.

By setting the ratio between the heat of fusion of the high-temperature peak and the heat of fusion of all melting peaks within such a range, it is considered that the expanded beads have particularly excellent mechanical strength and excellent in-mold moldability due to the presence of secondary crystals represented as the high-temperature peak.

Here, the heat of fusion of all melting peaks refers to the sum of the heat of fusion obtained from the areas of all the melting peaks in the DSC curve.

Figure 4:
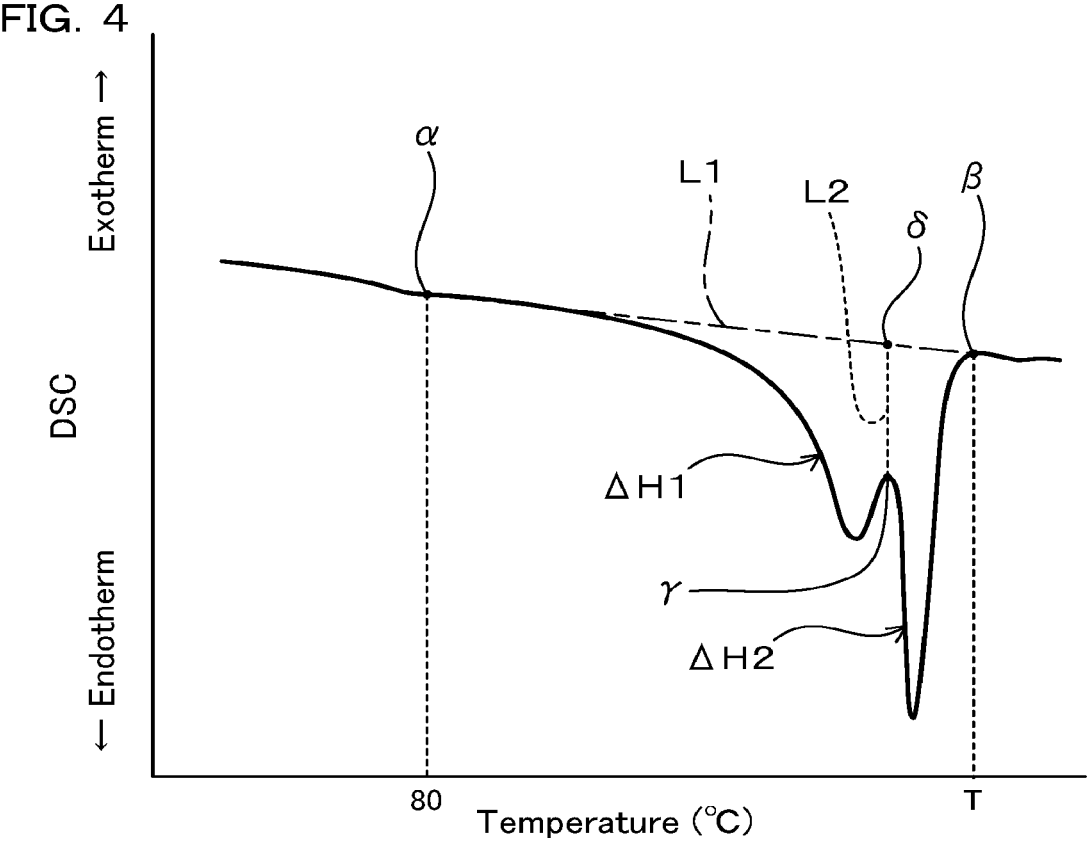
FIG. 4 is an explanatory diagram showing a method of calculating an area of a high-temperature peak.

The heat of fusion at each peak of the DSC curve of the expanded beads is a value obtained as follows. To start with, one expanded bead is collected from an expanded bead group after the state adjustment. Using the expanded bead as a test piece, a DSC curve is obtained when the test piece is heated from 23° C. to 200° C. at the heating rate of 10° C./min by a differential scanning calorimeter. FIG. 4 shows the example of the DSC curve. As exemplified in FIG. 4, the DSC curve has a resin-intrinsic peak ΔH1 and a high-temperature peak ΔH2 having a vertex on the higher-temperature side than the vertex of the resin-intrinsic peak ΔH1.

Next, a point α at a temperature of 80° C. on the DSC curve and a point ß at an end temperature T of melting of the expanded bead are connected to obtain a straight line L1. Next, a straight line L2 parallel to a vertical axis of the graph is drawn from a point γ on the DSC curve corresponding to a valley portion between the resin-intrinsic peak ΔH1 and the high-temperature peak ΔH2, and a point at which the straight line L1 and the straight line L2 intersect is defined as 8. Note that, the point γ can also be referred to as a maximum point existing between the resin-intrinsic peak ΔH1 and the high-temperature peak ΔH2.

An area of the resin-intrinsic peak ΔH1 is an area of a portion surrounded by the curve of the resin-intrinsic peak ΔH1 portion of the DSC curve, a line segment α-δ, and a line segment γ-δ, and this is taken as the heat of fusion of the resin-intrinsic peak.

The area of the high-temperature peak ΔH2 is the area of a portion surrounded by the curve of a high-temperature peak ΔH2 portion of the DSC curve, a line segment δ-β, and the line segment γ-δ, and this is taken as the heat of fusion of the high-temperature peak (that is, heat of high-temperature peak).

The area of all melting peaks is the area of a portion surrounded by the curve of the resin-intrinsic peak ΔH1 portion of the DSC curve, the curve of the high-temperature peak ΔH2 portion, and the line segment α-β (that is, the straight line L1), and this is taken as the heat of fusion of all melting peaks.

Next, a method for producing the expanded beads will be described. The expanded beads are produced by performing a dispersion step, a blowing agent impregnation step, and an expansion step. In the dispersion step, the tubular multilayer resin particles each having the through-hole are dispersed in the dispersion medium in the sealed container. In the blowing agent impregnation step, the multilayer resin particles dispersed in the dispersion medium are impregnated with the blowing agent. In the expansion step, multilayer resin particles containing a blowing agent are expanded. The expansion step is performed by, for example, a method of releasing the multilayer resin particles containing the blowing agent together with a dispersion medium under low pressure (that is, a dispersing medium release foaming method). Hereinafter, embodiments of the production method will be specifically described.

The multilayer resin particles each includes the core layer constituted by polypropylene-based resin and the fusion-bondable layer covering the core layer. The core layer is a substantially non-foamed layer, and the fusion-bondable layer is as described above.

The multilayer resin particles are produced, for example, as follows. Two extruders of an extruder for forming a core layer and an extruder for forming a fusion-bondable layer are connected to a co-extrusion die, and in the extruder for forming a core layer, the polypropylene-based resin for forming the core layer and an additive supplied as necessary are melt-kneaded, and in the extruder for forming a fusion-bondable layer, the polyolefin-based resin for forming the fusion-bondable layer and an additive supplied as necessary are melt-kneaded. Next, each melt-kneaded product is extruded and joined in the die to form a sheath-core composite including a cylindrical core layer in the non-foamed state and the fusion-bondable layer in the non-foamed state covering the outer surface of the cylindrical core layer by co-extrusion, and the composite is cooled while being extruded in a strand shape from pores of a spinneret attached to a tip of the extruder. An extrudate is cut, for example, with a pelletizer. A cutting method can be selected from a strand cutting method, a hot cutting method, an underwater cutting method, and the like. In this way, the multilayer resin particles including the cylindrical core layer having the through-holes and the fusion-bondable layer covering the core layer can be obtained.

A particle diameter of the multilayer resin particles is preferably 0.1 to 3.0 mm, and more preferably 0.3 to 1.5 mm. In addition, a length/outer diameter ratio of the resin particles is preferably 0.5 to 5.0, and more preferably 1.0 to 3.0. In addition, an average mass per one particle (obtained from the mass of 200 randomly selected particles) is preferably 0.1 to 20 mg, more preferably 0.2 to 10 mg, still more preferably 0.3 to 5 mg, and particularly preferably 0.4 to 2 mg. The mass ratio of the core layer and the fusion-bondable layer in the multilayer resin particles is preferably 99.5:0.5 to 85:15, more preferably 99:1 to 92:8, and still more preferably 97:3 to 90:10.

By adjusting the hole diameter dr of the through-holes of the core layer in the multilayer resin particles, the average hole diameter d of the through-holes of the foamed core layer in the expanded beads can be adjusted to the desired range above. The hole diameter dr of the through-holes of the core layer of the multilayer resin particles can be adjusted by, for example, a hole diameter (that is, an inner diameter of the die) of a small hole of the die for forming the through-holes. In addition, by adjusting the particle diameter and average mass of the multilayer resin particles, the average outer diameter and average wall thickness of the expanded beads can be adjusted to the desired ranges above.

From a viewpoint of producing expanded beads in which the average hole diameter d of the through-holes is less than 1 mm, the average hole diameter dr of the through-holes of the multilayer resin particles is less than 0.25 mm. From a viewpoint of more reliably producing expanded beads having a desired average hole diameter d, the average hole diameter dr of the through-holes of the multilayer resin particles is preferably less than 0.24 mm, and more preferably less than 0.22 mm. In addition, from a viewpoint of producing expanded beads in which the ratio d/D of the average hole diameter d to the average outer diameter D is 0.4 or less, the ratio dr/Dr of the average hole diameter dr to the average outer diameter Dr of the multilayer resin particles is 0.4 or less. From the viewpoint of producing expanded beads having a desired ratio dr/Dr, the ratio dr/Dr of the average hole diameter dr to the average outer diameter Dr of the multilayer resin particles is preferably 0.3 or less, more preferably 0.25 or less, and still more preferably 0.2 or less. Note that, from the viewpoint of production stability of the multilayer resin particles each having the through-hole, the average hole diameter dr of the through-holes of the multilayer resin particles is preferably 0.1 mm or more, and the ratio dr/Dr of the average hole diameter dr to the average outer diameter Dr of the multilayer resin particles is preferably 0.1 or more.

The average hole diameter dr of the through-holes of the multilayer resin particles is obtained as follows. 50 or more multilayer resin particles randomly selected from a multilayer resin particle group are cut perpendicularly to the penetration direction of the through-holes at the position where the area of the cut section is maximized. The cut section of each multilayer resin particle is photographed, the cross-sectional area (specifically, the opening area) of the through-hole portion is obtained, the diameter of the virtual perfect circle having the same area as the cross-sectional area of the through-hole portion is calculated, and the arithmetic average value thereof is taken as the average hole diameter dr of the through-holes of the multilayer resin particle. Note that, even in a case where the size of the through-hole of each multilayer resin particle is not uniform in the through-hole diameter in the penetration direction, the through-hole diameter of each multilayer resin particle is determined by the hole diameter at the position where the area of the cut section of the multilayer resin particle is maximized as described above.

The average outer diameter Dr of the multilayer resin particles is obtained as follows. 50 or more multilayer resin particles randomly selected from a multilayer resin particle group are cut perpendicularly to the penetration direction of the through-holes at the position where the area of the cut section is maximized. The cut section of each multilayer resin particle is photographed, the cross-sectional area (specifically, the cross-sectional area also including the opening portion of the through-hole is) of the multilayer resin particle is obtained, the diameter of the virtual perfect circle having the same area as the area of the cross-sectional area is calculated, and the arithmetic average value thereof is taken as the average outer diameter D of the multilayer resin particle. Note that, even in a case where the outer diameter of each multilayer resin particle is not uniform in the penetration direction, the outer diameter of each multilayer resin particle is determined by the outer diameter at the position where the area of the cut section of the multilayer resin particle in the direction perpendicular to the penetration direction is maximized as described above.

Note that, the particle diameter, the length/outer diameter ratio, and the average mass of the multilayer resin particles in the strand cutting method can be prepared by appropriately changing an extrusion speed, a take-up speed, a cutter speed, and the like when a resin melt is extruded. In addition, from a viewpoint of further increasing the circularity of the through-holes of the expanded beads described above, in the strand cutting method, the water temperature during cooling the extrudate (that is, the strand) is preferably 15° C. or lower.

As the dispersion medium (specifically, a liquid) for dispersing the multilayer resin particles obtained as described above in the sealed container, an aqueous dispersion medium is used. The aqueous dispersion medium is a dispersion medium (specifically, a liquid) containing water as a main component. A proportion of water in the aqueous dispersion medium is preferably 60% by mass or more, more preferably 70% by mass or more, and still more preferably 80% by mass or more. Examples of the dispersion medium other than water in the aqueous dispersion medium include ethylene glycol, glycerin, methanol, and ethanol.

Additives such as a cell nucleating agent, a crystal nucleating agent, a colorant, a flame retardant, a flame retardant aid, a plasticizer, an antistatic agent, an antioxidant, an ultraviolet inhibitor, a light stabilizer, a conductive filler, and an antibacterial agent can be added to the core layer of the multilayer resin particles as necessary. Examples of the cell nucleating agent include inorganic powders such as talc, mica, zinc borate, calcium carbonate, silica, titanium oxide, gypsum, zeolite, borax, aluminum hydroxide, and carbon; organic powders such as a phosphoric acid-based nucleating agent, a phenolic nucleating agent, an amine-based nucleating agent, and a polyfluoroethylene-based resin powder. In a case where the cell nucleating agent is added, a content of the cell nucleating agent is preferably 0.01 to 1 parts by mass based on 100 parts by mass of the polypropylene-based resin. As the colorant, carbon black is preferably added, and an content of carbon black is preferably 0.5 parts by mass or more and 5 parts by mass or less with respect to 100 parts by mass of the polypropylene-based resin. In addition, in a case where the core layer contains the carbon black, the fusion-bondable layer preferably contains 0.5 parts by mass or more and 5 parts by mass or less of carbon black.

For example, it is preferable to add a dispersant to the dispersion medium in the dispersion step so that the multilayer resin particles heated in the container are not fusion-bonded to each other in the expansion step by the dispersing medium release foaming method. The dispersant may be any dispersant as long as it prevents the fusion of the multilayer resin particles in the container, and can be used regardless of whether the dispersant is organic or inorganic, but a fine grained inorganic substance is preferable from a viewpoint of ease of handling. Examples of the dispersant include a clay mineral such as amsnite, kaolin, mica, clay, and the like. The clay mineral may be natural or synthetic. In addition, examples of the dispersant include aluminum oxide, titanium oxide, basic magnesium carbonate, basic zinc carbonate, calcium carbonate, and iron oxide. As the dispersant, one kind or two or more kinds are used. Among them, the clay mineral is preferably used as the dispersant. The dispersant is preferably added in an amount of about 0.001 to 5 parts by mass per 100 parts by mass of the multilayer resin particles.

Note that, in a case where the dispersant is used, an anionic surfactant such as sodium dodecylbenzenesulfonate, sodium alkylbenzenesulfonate, sodium lauryl sulfate, or sodium oleate is preferably used in combination as a dispersion aid. An addition amount of the dispersion aid is preferably 0.001 to 1 parts by mass per 100 parts by mass of the multilayer resin particles.

As the blowing agent for expanding the multilayer resin particles, a physical blowing agent is preferably used. Examples of the physical blowing agent include an inorganic physical blowing agent and an organic physical blowing agent, and examples of the inorganic physical blowing agent include carbon dioxide, air, nitrogen, helium, argon, and the like. In addition, examples of the organic physical blowing agent include aliphatic hydrocarbons such as propane, butane, and hexane, cyclic aliphatic hydrocarbons such as cyclopentane and cyclohexane, and halogenated hydrocarbons such as chlorofluoromethane, trifluoromethane, 1,1-difluoromethane, 1-chloro-1,1-dichloroethane, 1,2,2,2-tetrafluoroethane, methyl chloride, ethyl chloride, and methylene chloride. Note that, the physical blowing agent may be used alone or in combination of two or more kinds thereof. In addition, the inorganic physical blowing agent and the organic physical blowing agent may be mixed and used. From a viewpoint of environmental load and handleability, the inorganic physical blowing agent is preferably used, and the carbon dioxide is more preferably used. In a case where the organic physical blowing agent is used, it is preferable to use n-butane, i-butane, n-pentane, or i-pentane from a viewpoint of solubility in the polypropylene-based resin and expandability.

The addition amount of the blowing agent based on 100 parts by mass of the multilayer resin particles is preferably 0.1 to 30 parts by mass, and more preferably 0.5 to 15 parts by mass.

As a method for impregnating the multilayer resin particles with the blowing agent in the blowing agent impregnation step, a method is preferably used in which the multilayer resin particles are dispersed in the aqueous dispersion medium in the sealed container, and the blowing agent is injected while heating to impregnate the multilayer resin particles with the blowing agent.

After impregnation with the blowing agent, it is preferable to perform a holding step of growing the secondary crystals at a constant temperature, and then perform the expansion step. In the expansion step, for example, by releasing the content in the sealed container to a pressure lower than the pressure in the sealed container, at least the core layer in the multilayer resin particles containing the blowing agent can be expanded to obtain expanded beads.

In the expansion step, the internal pressure of the sealed container during the expanding is preferably 0.5 MPa (G: gauge pressure) or more. On the other hand, the internal pressure of the sealed container is preferably 4.0 MPa (G) or less. Within the above range, the expanded beads can be produced safely without a risk of breakage, explosion, or the like of the sealed container.

By raising the temperature of the aqueous dispersion medium in the expansion step at 1 to 5° C./min, the temperature during the expanding can also be set to an appropriate range.

The expanded beads having the crystal structure in which the melting peak (the resin-intrinsic peak) inherent to a resin and one or more melting peaks (the high-temperature peaks) appear on the high-temperature side thereof in the DSC curve obtained by the differential scanning calorimetry (DSC) are obtained, for example, as follows.

During heating in the expanded bead production step, a first holding step of holding at a temperature of (the melting point of the polypropylene-based resin −20° C.) or higher and lower than (the end temperature of melting of the polypropylene-based resin) for a sufficient time of period, preferably about 10 to 60 minutes is performed. Thereafter, the temperature is adjusted to a temperature of (the melting point of the polypropylene resin −15° C.) to (the end temperature of melting of the polypropylene resin +10° C.). Then, if necessary, a second holding step of holding at that temperature for a more sufficient time of period, preferably about 10 to 60 minutes is performed. Next, by releasing the expandable resin particles containing the blowing agent from inside of the sealed container to a low pressure and expanding the expandable resin particles, the expanded beads having the crystal structure described above can be obtained. The expanding is preferably performed in the sealed container at (the melting point of the polypropylene resin −10° C.) or higher, and more preferably performed at (the melting point of the polypropylene resin) or higher and (the melting point of the polypropylene resin +20° C.) or lower.

In addition, in the production of expanded beads having a particularly low apparent density, it is possible to perform the two-step expansion method in which the expanded beads are charged into a pressurizable sealed container, pressurized gas such as air is injected into the container to increase the internal pressure of the expanded beads, and the expanded beads are heated in the container using the heating medium such as steam for a predetermined time of period to obtain the expanded beads having a particularly low apparent density.

The molded article can be obtained by in-mold molding of the expanded beads as described above (that is, the in-mold molding method). The in-mold molding method is performed by filling the expanded beads in a mold and heat-molding the expanded beads using the heating medium such as steam. Specifically, after the expanded beads are filled in the mold, the heating medium such as steam is introduced into the mold, whereby the expanded beads are heated to be secondarily expanded, and are mutually fusion-bonded to obtain a molded article in which a shape of a molding space is formed.

The molded article is formed by, for example, the in-mold molding of expanded beads, and is composed of the large number of expanded beads fusion-bonded to each other. The molded article has an open cell structure. The open cell structure is a minute space portion communicating with outside of the molded article. The open cell structure is formed by complicatedly connecting voids formed by allowing the through-holes of a plurality of expanded beads to communicate with each other, voids formed by allowing the through-holes of the expanded beads to communicate with voids formed between the expanded beads, voids formed by allowing the voids between the expanded beads to communicate with each other, open cell portions of the expanded beads constituting the molded article, and the like.

The open cell content of the molded article is preferably 2.5% or more and 12% or less. In a case where the open cell content of the molded article is within the range above, it is possible to more stably prevent the significant shrinkage and deformation of the molded article in a case of omitting the aging step. This is considered to be because the air more quickly flows into the cells in the molded article after the demolding and the internal pressure of the entire molded article is more easily increased. In addition, the appearance and rigidity of the molded article are further improved. From a viewpoint of more stably preventing the dimensional change of the molded article, the open cell content of the molded article is more preferably 3% or more, still more preferably 4% or more, and still more preferably 4.5% or more. On the other hand, from a viewpoint of further improving the appearance and rigidity of the molded article, the open cell content of the molded article is more preferably 10% or less, still more preferably 8% or less, further more preferably 7.5% or less, and particularly preferably 6% or less. By performing the in-mold molding using the expanded beads, the open cell content of the molded article can be easily adjusted to the range above.

The open cell content of the molded article is measured in accordance with ASTM 2856-70 Procedure B. In other words, the measurement is performed by a method of correcting and obtaining closed cells in consideration of the closed cells broken when the measurement sample is cut out. As a measuring device, a dry automatic densitometer (specifically, AccuPyc II 1340 manufactured by Shimadzu Corporation) is used. Specifically, the open cell content is measured as follows. To start with, a state of the molded article is adjusted by allowing the molded article to stand at 23° C. for 12 hours. Next, a first test piece having a cubic shape of 2.5 cm in length×2.5 cm in width×2.5 cm in height is cut out from a central portion of the molded article, and its geometric volume Va [unit: cm$^3$] is measured. Specifically, Va is a value obtained by vertical dimension [cm]× horizontal dimension [cm]×height dimension [cm]. A true volume V1 [unit: cm$^3$] of the first test piece is measured with the dry automatic densitometer. Next, the first test piece is divided into 8 equal parts to obtain a cubic second test piece of 1.25 cm in length×1.25 cm in width×1.25 cm in height. Next, a true volume V2 [unit: cm$^3$] of the second test piece is measured with the dry automatic densitometer. Note that, the true volume V2 of the second test piece is the arithmetic average value of the true volumes of each of the 8 test pieces cut out from the first test piece. An open cell content Co [unit:%] is calculated by the following formula (III). Five first test pieces are cut out from the molded article, the open cell content is calculated, and the arithmetic average value thereof is used as a result. Note that, in this way, the open cell content Co measured is also referred to as a corrected open cell content.

$$Co = (Va - 2V1 + V2) \times 100/Va \quad \text{(III)}$$

From the viewpoint that the dimensional change can be more sufficiently prevented even when the aging step is omitted, the voidage of the molded article is preferably 4% or more, more preferably 4.5% or more, and still more preferably 5% or more. On the other hand, from a viewpoint of further improving the rigidity and the appearance, the voidage of the molded article is preferably 15% or less, and more preferably 12% or less. The voidage of the molded article can be measured by the measurement method described above.

The density of the molded article is preferably 10 kg/m$^3$ or more and 100 kg/m$^3$ or less. In this case, the lightweight property and rigidity of the molded article can be improved in a well-balanced manner. From a viewpoint of further improving the rigidity of the molded article, the density of the molded article is more preferably 15 kg/m$^3$ or more, still more preferably 20 g/m$^3$ or more, and particularly preferably 25 kg/m$^3$ or more. From a viewpoint of further improving the lightweight property of the molded article, the density of the molded article is more preferably 45 kg/m$^3$ or less, still more preferably 40 kg/m$^3$ or less, and still more preferably 38 kg/m$^3$ or less.

Conventionally, in a case of producing a molded article having a low density, the molded article is remarkably easily deformed after the demolding, and thus it is particularly difficult to omit the aging step. On the other hand, according to the expanded beads in the present disclosure, the aging step can be omitted even in a case where the apparent density is small, and the molded article having a desired shape and excellent appearance and rigidity can be produced even without aging. From such a viewpoint, the density of the molded article is preferably set within the range above. The density of the molded article is calculated by dividing the weight (g) of the molded article by the volume (L) obtained from the outer dimension of the molded article and performing unit conversion. Note that, in a case where it is not easy to obtain the volume from the outer dimension of the molded article, a volume of the molded article can be obtained by a submersion method.

From the viewpoint of further improving the mechanical strength, a maximum bending strength of the molded article is preferably 250 kPa or more, more preferably 300 kPa or more, and still more preferably 320 kPa or more. The maximum bending strength can be measured in accordance with JIS K7221-2:2006 with a maximum point of the bending strength of the molded article as the maximum bending strength.

A ratio [S/DE] of the maximum bending strength S of the molded article to a density DE of the molded article is preferably 9 kPa·m$^3$/kg or more and 15 kPa·m$^3$/kg or less. In this case, an effect of excellent rigidity of the molded article of expanded beads is obtained. From the viewpoint of further improving the rigidity of the molded article, the ratio [S/DE] of the maximum bending strength S of the molded article to the density D of the molded article is more preferably 9.5 kPa·m$^3$/kg or more, still more preferably 10 kPa·m$^3$/kg or more. Note that, the density DE of the molded article to be used in the above calculation means the density of the test piece to be subjected to the measurement of the maximum bending strength.

The molded article is also used as a sound absorbing material, an impact absorbing material, a cushioning material, and the like in various fields such as a vehicle field such as an automobile and a building field.

EXAMPLES

Next, the present invention will be described in more detail with reference to the examples, but the present invention is not limited to these examples at all.

The following measurement and evaluation were performed on the resins, the expanded beads, and molded articles used in the examples and the comparative examples. Note that, an evaluation of the expanded beads was performed after the state of the expanded beads was adjusted by allowing the expanded beads to stand for 24 hours under the conditions of a relative humidity of 50%, 23° C., and 1 atm. In addition, the physical properties of the molded article were measured and evaluated using a molded article molded without performing the aging step. Specifically, in the production of a molded article to be described later, the molded article after the demolding was left to stand for 12 hours under the conditions of a relative humidity of 50%, 23° C., and 1 atm to adjust the state, and the physical properties were measured and evaluated using the molded article.

<Polypropylene-Based Resin>

Table 1 shows properties and the like of the polypropylene-based resin used for producing the expanded beads. Note that, the ethylene-propylene copolymer and the ethylene-propylene-butene copolymer used in this example are both random copolymers.

In addition, the density of the polypropylene-based resin is 900 kg/m$^3$.

TABLE 1

| Symbol | Material | Catalyst | Comonomer | Flexural modulus (MPa) | Melting point (° C.) | MFR (g/10 min) |
|---|---|---|---|---|---|---|
| PP1 | Ethylene-propylene Random Copolymer | Ziegler-Natta | Ethylene 3.1% | 980 | 142 | 8 |
| PP2 | Ethylene-propylene Random Copolymer | Ziegler-Natta | Ethylene 3.7% | 750 | 137 | 5 |
| PP3 | Ethylene-propylene Random Copolymer | Ziegler-Natta | Ethylene 1.4% | 1470 | 153 | 7 |
| PP4 | Propylene Homopolymer | Ziegler-Natta | — | 1650 | 162 | 10 |
| PP5 | Mixed Resin of PP1 (80% by weight) and PP3 (20% by weight) | — | Ethylene 2.8% | 1070 | 144 | 8 |
| PP6 | Mixed Resin of PP1 (95% by weight) and PP3 (5% by weight) | — | Ethylene 3.0% | 1010 | 143 | 8 |
| PP7 | Ethylene-propylene-butene Random Copolymer | Ziegler-Natta | Ethylene 3.1% Butene 3.8% | 650 | 133 | 6 |

(Monomer Component Content of Polypropylene-Based Resin)

A content of the monomer component in the polypropylene-based resin (specifically, ethylene-propylene copolymer and ethylene-propylene-butene copolymer) was obtained by a known method obtained by the IR spectrum. Specifically, the known method refers to a method described in Polymer Analysis Handbook (edited by Polymer Analysis Research Council, Japan Society for Analytical Chemistry, publication date: January 1995, publishing company: Kinokuniya, page number and item name: 615 to 616 "II. 2.3 2.3.4 Propylene/ethylene copolymer", 618 to 619 "II. 2.3 2.3.5 Propylene/butene copolymer"), that is, the method of quantifying from relationship between a value obtained by correcting the absorbance of ethylene and butene with a predetermined coefficient and a thickness of a film-like test piece. More specifically, to start with, the polypropylene-based resin was hot-pressed in an environment at 180° C. to be formed into a film, thereby preparing a plurality of test pieces having different thicknesses. Next, the absorbance at 722 $cm^{-1}$ and 733 $cm^{-1}$ derived from ethylene ($A_{722}$ and $A_{733}$) and the absorbance at 766 $cm^{-1}$ derived from butene ($A_{766}$) were read by measuring the IR spectrum of each test piece. Next, for each test piece, ethylene component content in the polypropylene-based resin was calculated using the following formulae (1) to (3). The value obtained by arithmetically averaging the ethylene component content obtained for each test piece was taken as the ethylene component content (unit: wt %) in the polypropylene-based resin.

$$(K'_{733})_c = 1/0.96\{(K'_{733})_a - 0.268(K'_{722})_a\} \quad (1)$$

$$(K'_{722})_c = 1/0.96\{(K'_{722})_a - 0.268(K'_{722})_a\} \quad (2)$$

$$\text{Ethylene component content (\%)} = 0.575 \{(K'_{722})_c + (K'_{733})_c\} \quad (3)$$

However, in the formulae (1) to (3), $K'_a$ represents an apparent absorption coefficient at each wave number ($K'_a = A/\rho t$), $K'_c$ represents a corrected absorption coefficient, A represents absorbance, $\rho$ represents a density of the resin (unit: $g/cm^3$), and t represents a thickness of the film-like test piece (unit: cm). Note that, the above formulae (1) to (3) can be applied to the random copolymers.

In addition, for each test piece, butene component content in the polypropylene-based resin was calculated using the following formula (4). A value obtained by arithmetically averaging the butene component content obtained for each test piece was taken as the butene component content (%) in the polypropylene-based resin.

$$\text{Butene component content (\%)} = 12.3 \left(A_{766}/L\right) \quad (4)$$

However, in the formula (4), A represents the absorbance, and L represents the thickness (mm) of the film-like test piece.

(Flexural Modulus of Polypropylene-Based Resin)

The polypropylene resin was heat-pressed at 230° C. to prepare a 4 mm sheet, and a test piece of 80 mm in length×10 mm in width×4 mm in thickness was cut out from the sheet. The flexural modulus of this test piece was obtained in accordance with JIS K7171:2008. Note that, a radius R1 of an indenter and a radius R2 of a support base are both 5 mm, a distance between the support points is 64 mm, and a test speed is 2 mm/min.

(Melting Point of Polypropylene-Based Resin)

The melting point of the polypropylene resin was obtained in accordance with JIS K7121:1987. Specifically, "(2) The case of measurement of melting temperature after a definite heat treatment" was employed as the state adjustment, the DSC curve was obtained by raising the temperature of the test piece subjected to the state adjustment from 30° C. to 200° C. at the heating rate of 10° C./min, and the vertex temperature of the melting peak was defined as the melting point. Note that, as the measuring device, a heat flux differential scanning calorimeter (manufactured by SII NanoTechnology Inc., model number: DSC7020) was used.

(Melt flow rate of polypropylene-based resin)

The melt flow rate (that is, the MFR) of the polypropylene-based resin was measured under the conditions of the temperature of 230° C. and the load of 2.16 kg in accordance with JIS K7210-1:2014.

Table 2 and Table 3 show the properties etc. of multilayer resin particles and expanded beads in the examples and the comparative examples.

TABLE 2

| | Example No. | | Example 1 | Example 2 | Example 3 | Example 4 | Example 5 | Example 6 | Example 7 | Example 8 |
|---|---|---|---|---|---|---|---|---|---|---|
| Resin Particle | Foamed Core Layer | Type of Resin | — | PP1 | PP1 | PP1 | PP5 | PP1 | PP1 | PP6 | PP1 |
| | | Flexural Modulus | MPa | 980 | 980 | 980 | 1070 | 980 | 980 | 1010 | 980 |
| | | Melting Point | ° C. | 142 | 142 | 142 | 144 | 142 | 142 | 143 | 142 |
| | Fusion-bondable Layer | Type of Resin | MPa | PP7 | PP7 | PP7 | PP7 | PP7 | PP7 | PP7 | PP7 |
| | | Mass Ratio of Fusion-bondable Layer | % | 5 | 10 | 5 | 5 | 5 | 1 | 5 | 5 |
| | | Mass of Resin Particle | mg | 1.5 | 1.5 | 1.5 | 1.5 | 1.5 | 1.5 | 1.5 | 1.5 |
| | | Length | mm | 2 | 2 | 2 | 2 | 2 | 2 | 2 | 2 |
| | | Average Hole Diameter dr | mm | 0.20 | 0.21 | 0.20 | 0.21 | 0.20 | 0.20 | 0.22 | 0.20 |
| | | Average Outer Diameter Dr | mm | 1.16 | 1.16 | 1.16 | 1.14 | 1.16 | 1.15 | 1.16 | 1.16 |
| First Expansion Step | | Expansion Temperature | ° C. | 150.1 | 150.0 | 147.0 | 153.1 | 148.1 | 150.1 | 151.1 | 150.1 |
| | | Carbon Dioxide Pressure | MPa(G) | 2.6 | 2.7 | 3.8 | 2.6 | 4.0 | 2.5 | 2.6 | 2.6 |
| | | Bulk Ratio | Times | 19.1 | 19.1 | 38.3 | 18.5 | 36.7 | 18.9 | 19.1 | 19.1 |
| Second Expansion Step | | Internal Pressure | MPa(G) | 0.5 | 0.5 | — | 0.5 | — | 0.5 | 0.5 | 0.5 |
| | | Drum Pressure | MPa(G) | 0.035 | 0.035 | — | 0.035 | — | 0.035 | 0.035 | 0.035 |
| Expanded Bead | | Bulk Density | kg/m³ | 24.0 | 24.0 | 23.5 | 23.9 | 24.5 | 23.9 | 24.0 | 24.0 |
| | | Bulk Ratio | Times | 37.5 | 37.5 | 38.3 | 37.7 | 36.7 | 37.7 | 37.5 | 37.5 |
| | | Apparent Density | kg/m³ | 42.6 | 42.3 | 41.6 | 42.3 | 43.2 | 43 | 42.6 | 42.6 |

TABLE 2-continued

| Example No. | | Example 1 | Example 2 | Example 3 | Example 4 | Example 5 | Example 6 | Example 7 | Example 8 |
|---|---|---|---|---|---|---|---|---|---|
| Apparent Density/Bulk Density | — | 1.78 | 1.76 | 1.77 | 1.77 | 1.76 | 1.80 | 1.78 | 1.78 |
| Closed Cell Content | % | 98 | 98 | 96 | 98 | 95 | 98 | 97 | 98 |
| Heat of High-temperature Peak | J/g | 14.5 | 14.4 | 13.4 | 14.4 | 14.7 | 14.8 | 14.6 | 14.5 |
| Average Hole Diameter of Through-hole d | mm | 0.70 | 0.73 | 0.95 | 0.75 | 0.80 | 0.69 | 0.72 | 0.70 |
| Circularity of Through-hole | — | 0.97 | 0.96 | 0.97 | 0.96 | 0.96 | 0.97 | 0.96 | 0.97 |
| Average Outer Diameter D | mm | 3.69 | 3.85 | 3.98 | 3.80 | 3.69 | 3.70 | 3.72 | 3.69 |
| d/D | — | 0.19 | 0.19 | 0.24 | 0.20 | 0.22 | 0.19 | 0.19 | 0.19 |
| Average Wall Thickness t | mm | 1.49 | 1.56 | 1.52 | 1.53 | 1.45 | 1.51 | 1.50 | 1.49 |
| t/D | — | 0.40 | 0.41 | 0.38 | 0.40 | 0.39 | 0.41 | 0.40 | 0.40 |
| Moldable Range with Aging | MPa(G) | 0.22-0.34 | 0.22-0.34 | 0.22-0.34 | 0.22-0.34 | 0.22-0.34 | 0.22-0.34 | 0.22-0.34 | 0.22-0.34 |
| Non-aging Moldability | — | Good | Good | Good | Good | Good | Good | Good | Good |

TABLE 3

| Comparative Example No. | | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Resin Particle | Foamed Core Layer | Type of Resin | — | PP1 | PP1 | PP1 | PP1 | PP1 | PP1 | PP2 | PP4 | PP1 |
| | | Flexural Modulus | MPa | 980 | 980 | 980 | 980 | 980 | 980 | 750 | 1650 | 980 |
| | | Melting Point | °C. | 142 | 142 | 142 | 142 | 142 | 142 | 137 | 162 | 142 |
| | Fusion-bondable Layer | Type of Resin | MPa | PP7 | PP7 | — | — | — | PP7 | PP7 | PP7 | PP7 |
| | | Mass Ratio of Fusion-bondable Layer | % | 5 | 5 | — | — | — | 20 | 5 | 5 | 5 |
| | | Mass of Resin Particle | mg | 1.5 | 1.5 | 1.5 | 1.5 | 1.5 | 1.5 | 1.5 | 1.5 | 1.5 |
| | | Length | mm | 2 | 2 | 2 | 2 | 2 | 2 | 2 | 2 | 2 |
| | | Average Hole Diameter dr | mm | — | 0.76 | 0.20 | 0.20 | 0.20 | 0.22 | 0.20 | 0.21 | 0.56 |
| | | Average Outer Diameter Dr | mm | — | 1.21 | 1.15 | 1.15 | 1.15 | 1.16 | 1.14 | 1.14 | 1.21 |
| First Expansion Step | | Expansion Temperature | C | 149.5 | 146.4 | 150.1 | 150.1 | 150.1 | 149.9 | 142.7 | 165.5 | 147 |
| | | Carbon Dioxide Pressure | MPa(G) | 1.9 | 3.3 | 2.6 | 2.6 | 2.6 | 2.9 | 3.3 | 4.3 | 3.6 |
| | | Bulk Ratio | Times | 17.0 | 45.0 | 19.5 | 19.5 | 19.5 | 19.3 | 17.1 | 34.6 | 36.7 |
| Second Expansion Step | | Internal Pressure | MPa(G) | 0.5 | — | 0.5 | 0.5 | 0.5 | 0.5 | 0.39 | — | — |
| | | Drum Pressure | MPa(G) | 0.035 | — | 0.035 | 0.035 | 0.035 | 0.04 | 0.02 | — | — |
| Expanded Bead | | Bulk Density | kg/m³ | 25.2 | 20.0 | 24.0 | 24.0 | 24.0 | 23.5 | 22.5 | 26.0 | 24.5 |
| | | Bulk Ratio | Times | 35.7 | 45.0 | 37.5 | 37.5 | 37.5 | 38.3 | 40.0 | 34.6 | 36.7 |
| | | Apparent Density | kg/m³ | 40.3 | 55.5 | 42.6 | 42.6 | 42.6 | 42 | 40.3 | 45.5 | 50.5 |
| | | Apparent Density/Bulk Density | — | 1.60 | 2.78 | 1.78 | 1.78 | 1.78 | 1.79 | 1.79 | 1.75 | 2.06 |
| | | Closed Cell Content | % | 97 | 98 | 99 | 99 | 99 | 98 | 98 | 96 | 98 |
| | | Heat of High-temperature Peak | J/g | 14.0 | 14.9 | 14.7 | 14.7 | 14.7 | 14.3 | 14.5 | 27.2 | 14.5 |
| | | Average Hole Diameter of Through-hole d | mm | — | 3.31 | 0.70 | 0.70 | 0.70 | 0.72 | 0.71 | 0.80 | 1.55 |
| | | Circularity of Through-hole | — | — | 0.98 | 0.96 | 0.96 | 0.96 | 0.97 | 0.97 | 0.95 | 0.98 |
| | | Average Outer Diameter D | mm | 3.71 | 3.78 | 3.70 | 3.70 | 3.70 | 3.74 | 4.02 | 3.30 | 3.60 |
| | | d/D | — | — | 0.88 | 0.19 | 0.19 | 0.19 | 0.19 | 0.18 | 0.24 | 0.43 |
| | | Average Wall Thickness t | mm | — | 0.23 | 1.50 | 1.50 | 1.50 | 1.51 | 1.66 | 1.25 | 1.00 |
| | | t/D | — | — | 0.06 | 0.41 | 0.41 | 0.41 | 0.40 | 0.41 | 0.38 | 0.28 |
| | | Moldable Range with Aging | MPa(G) | 0.28-.0.32 | 0.22-0.24 | 0.28-0.34 | 0.26-0.34 | 0.28-0.34 | 0.22-0.30 | 0.22-0.28 | 0.32-0.40 | 0.22-0.28 |
| | | Non-aging Moldability | — | Poor | Good | Poor | Poor | Poor | Poor | Poor | Good | Good |

(Length of Multilayer Resin Particles)

The length of the multilayer resin particles was obtained as follows. A maximum length of 100 multilayer resin particles randomly selected from the multilayer resin particle group was measured with a vernier caliper, and the arithmetic average value thereof was taken as the length of the multilayer resin particles.

(Average Hole Diameter Dr of Through-Holes of Multilayer Resin Particles)

The average hole diameter of the through-holes of the multilayer resin particles was obtained as follows. 100 multilayer resin particles randomly selected from the multilayer resin particle group were cut perpendicularly to the penetration direction of the through-holes at a position where the area of the cut section was substantially maximum. The cut section of each multilayer resin particle was photographed, and the cross-sectional area (the opening area) of the through-hole portion in the cross-sectional photograph was obtained. The diameter of the virtual perfect circle having the same area as the cross-sectional area of the through-hole portion was calculated, and the arithmetic average value thereof was taken as the average hole diameter (dr) of the through-holes of the multilayer resin particles.

(Average Outer Diameter Dr of Multilayer Resin Particles)

The average outer diameter of the multilayer resin particles was obtained as follows. 100 multilayer resin particles randomly selected from the multilayer resin particle group were cut perpendicularly to the penetration direction of the through-holes at a position where the area of the cut section was substantially maximum. The cut section of each multilayer resin particle was photographed to obtain the cross-sectional area (including the opening part of the through-hole) of the multilayer resin particle. The diameter of the virtual perfect circle having the same area as the cross-sectional area of the multilayer resin particle was calculated, and the arithmetic average value thereof was taken as the average outer diameter (Dr) of the multilayer resin particles.

(Average Hole Diameter d of Through-Holes)

The average hole diameter of the through-holes of the expanded beads was obtained as follows. 100 expanded beads randomly selected from the expanded bead group after the state adjustment were cut perpendicularly to the penetration direction of the through-holes at the position where the area of the cut section was substantially the maximum. The cut section of each expanded bead was photographed, and the cross-sectional area (the opening area) of the through-hole portions in the cross-sectional photograph was obtained. The diameter of the virtual perfect circle having the same area as the cross-sectional area of the through-hole portions was calculated, and the arithmetic average thereof was taken as the average hole diameter (d) of the through-holes of the expanded beads.

(Circularity of Through-Holes)

The circularity of the expanded beads was obtained as follows. 100 expanded beads randomly selected from the expanded bead group after the state adjustment are cut perpendicularly to the penetration direction of the through-holes at the position where the area of the cut section is substantially the maximum. The cut section of each expanded bead is photographed, and the cross-sectional area S (the opening area) and the peripheral length C of the through-hole portion are obtained. The circularity was obtained by the following formula (a).

$$\text{Circularity} = 4\pi S/(C \times C) \tag{$\alpha$}$$

Here, x means the circular constant.

(Average Outer Diameter D)

The average outer diameter of the expanded beads was obtained as follows. 100 expanded beads randomly selected from the expanded bead group after the state adjustment were cut perpendicularly to the penetration direction of the through-holes at the position where the area of the cut section was substantially the maximum. The cut section of each expanded bead was photographed to obtain the cross-sectional area of the expanded bead (including the opening portion of the through-hole). The diameter of the virtual perfect circle having the same area as the cross-sectional area of the expanded bead was calculated, and the arithmetic average value thereof was taken as the average outer diameter (D) of the expanded beads.

(Average Wall Thickness t)

The average wall thickness of the expanded beads was obtained by the following formula (5).

$$\text{Average wall thickness } t = (\text{average outer diameter } D - \text{average hole diameter } d)/2 \tag{5}$$

(Bulk Density and Bulk Ratio)

The bulk density of the expanded beads was obtained as follows. The expanded beads were randomly taken out from the expanded bead group after the state adjustment, placed in the measuring cylinder having a volume of 1 L, a large number of the expanded beads were accommodated up to a scale of 1 L so as to be in a natural deposition state, the mass W2 [g] of the accommodated expanded beads was divided by the accommodation volume V2 (1[L]) (W2/V2), and the unit was converted to [kg/m³], whereby the bulk density of the expanded beads was obtained. In addition, the bulk ratio [times] of the expanded beads was obtained by dividing the density [kg/m³] of the resin constituting the expanded layer of the expanded beads by the bulk density [kg/m³] of the expanded beads.

(Apparent Density)

The apparent density of the expanded beads was obtained as follows. To start with, the measuring cylinder containing ethanol at a temperature of 23° C. was prepared, and an arbitrary amount of the expanded bead group (a mass W1 [g] of the expanded bead group) after the state adjustment was immersed in ethanol in the measuring cylinder using the wire mesh. Then, in consideration of the volume of the wire mesh, the volume V1 [L] of the expanded bead group read from the increase in water level was measured. The apparent density of the expanded beads was obtained by dividing the mass W1 [g] of the expanded bead group placed in the measuring cylinder by the volume V1 [L] (W1/V1) and converting the unit to [kg/m³].

(Closed Cell Content)

The closed cell content of the expanded beads was measured using the air-comparison pycnometer based on ASTM-D2856-70 Procedure C. Specifically, it was obtained as follows. Using expanded beads having a bulk volume of about 20 cm³ after the state adjustment as a measurement sample, an apparent volume Va was accurately measured by an ethanol immersion method as to be described below. The measurement sample whose apparent volume Va had been measured was sufficiently dried, and then the true volume value Vx of the measurement sample measured by AccuPyc II 1340 manufactured by Shimadzu Corporation was measured in accordance with Procedure C described in ASTM- D2856-70. Then, based on these volume values Va and Vx, the closed cell content was calculated by the following formula (6), and the average value of the five samples (N=5) was taken as the closed cell content of the expanded beads.

$$\text{Closed cell content (\%)} = (Vx - W/\rho) \times 100/(Va - W/\rho) \quad (6)$$

Provided that
Vx: the true volume of the expanded beads measured by the above method, that is, a sum of the volume of the resin constituting the expanded beads and a total volume of the closed cell portion in the expanded beads (unit: $cm^3$),
Va: the apparent volume (unit: $cm^3$) of expanded beads measured from an increase in water level when expanded beads are immersed in a measuring cylinder containing ethanol,
W: weight of the measurement sample for expanded beads (unit: g), and
ρ: density of resin constituting expanded beads (unit: $g/cm^3$).

(Heat of High-Temperature Peak of Expanded Beads)

One expanded bead was collected from the expanded bead group after the state adjustment. Using the expanded bead as the test piece, the DSC curve was obtained when the test piece was heated from 23° C. to 200° C. at the heating rate of 10° C./min by the differential scanning calorimeter (specifically, DSC.Q 1000 manufactured by TA Instruments). In the DSC curve, the area of the high-temperature peak was obtained, and this was taken as the heat of high-temperature peak.

The above measurement was performed on five expanded beads, and the arithmetic average value was shown in Table 2 and Table 3.

(Moldable Range with Aging)

To start with, the molded article was molded by changing molding steam pressure by 0.02 MPa between 0.20 to 0.32 MPa (G) by the method of <Production of molded articles> to be described later. Note that, the conditions of the pre-pressurization and a cracking width were the conditions described in the columns of the molding step in Tables 4 and 5, respectively. After the demolding, the molded article was allowed to stand in an oven at 80° C. for 12 hours. The aging step is leaving in the oven for 12 hours. After the aging step, the state of the molded article was adjusted by allowing the molded article to stand for 24 hours under the conditions of a relative humidity of 50%, 23° C., and 1 atm. Next, the fusion-bondability and recoverability (specifically, the recoverability of swell or contraction after the in-mold molding) of the molded article were evaluated. As a result, the steam pressure (that is, the steam pressure at which an acceptable product was acquirable) that passed all the items in the evaluation criteria to be described later was set as the steam pressure at which molding with aging was possible. Note that, it is to be noted that the lower the steam pressure at which aging can be performed and the wider the range, the better the moldability.

(Non-Aging Moldability)

The fusion-bondability and recoverability of the molded article were evaluated by the same method as described above (the moldable range with aging) except that the aging step of leaving the molded article to stand for a predetermined period of time under the high-temperature atmosphere adjusted to a temperature of about 60° C. to 80° C. after demolding the molded article was not performed. As a result, a case where the acceptable product was obtained at any molding steam pressure was evaluated as "Good", and a case where the acceptable product was not obtained at any molding steam pressure was evaluated as "Poor".

(Fusion-Bondability)

The molded article was bent and broken, the number C1 of expanded beads present on a broken surface and number C2 of broken expanded beads were obtained, and a ratio of the number of broken expanded beads to the number of expanded beads present on the broken surface (that is, a material fracture rate) was calculated. The material fracture rate is calculated from a formula of C2/C1×100. The above measurement was performed five times using different test pieces, and the material fracture rate was obtained. When an arithmetic average value of the material fracture rate was 90% or more, it was defined as acceptable.

(Recoverability)

A thickness near four corners (specifically, 10 mm inside from the corner in a center direction) and a thickness at a center (a portion equally divided into two in both a longitudinal direction and a lateral direction) of a molded article obtained using a flat plate-shaped mold of 300 mm in length, 250 mm in width, and 60 mm in thickness were measured, respectively. Next, a ratio (unit:%) of a thickness of the thinnest portion to a thickness of the thickest portion among the measured portions was calculated, and the case where the ratio was 95% or more was regarded as acceptable.

<Molded Article>

Table 4 and Table 5 show the properties and the like of the molded articles of the examples and the comparative examples.

TABLE 4

| | Example No. | | Example 1 | Example 2 | Example 3 | Example 4 | Example 5 | Example 6 | Example 7 | Example 8 |
|---|---|---|---|---|---|---|---|---|---|---|
| Molding Step | Bead Internal Pressure in Pre-pressurization | MPa(G) | — | — | — | — | — | — | — | 0.05 |
| | Cracking Width | % | 20 | 20 | 20 | 20 | 20 | 20 | 20 | 10 |
| | Molding Pressure | MPa(G) | 0.22 | 0.22 | 0.22 | 0.22 | 0.22 | 0.22 | 0.22 | 0.22 |
| | Water Cooling Time | Seconds | 0 | 0 | 0 | 0 | 0 | 0 | 0 | 0 |
| Molded Article | Open Cell Content | % | 3.9 | 4.1 | 5.3 | 4.1 | 7.8 | 4.3 | 4.0 | 3.5 |
| | Density of Molded Article | $kg/m^3$ | 34 | 34 | 33 | 34 | 34 | 34 | 34 | 32 |
| | Voidage | % | 12.0 | 11.5 | 6.6 | 11.9 | 11.5 | 11.9 | 12.1 | 10.0 |
| | Evaluation of Appearance | — | A | A | A | A | A | A | A | A |
| | Compressive Stress of 50% | kPa | 239 | 237 | 223 | 236 | 235 | 240 | 243 | 225 |
| | Density (compression) of Cut-out Molded Article | $kg/m^3$ | 33 | 33 | 32 | 33 | 33 | 33 | 33 | 31 |

TABLE 4-continued

| Example No. | | Example 1 | Example 2 | Example 3 | Example 4 | Example 5 | Example 6 | Example 7 | Example 8 |
|---|---|---|---|---|---|---|---|---|---|
| Maximum Bending Strength S | kPa | 353 | 350 | 327 | 348 | 346 | 353 | 357 | 338 |
| Density (bending) of Cut-out Molded Article DE | kg/m³ | 33 | 33 | 32 | 33 | 33 | 33 | 33 | 31 |
| S/DE | kPa · m³/kg | 10.6 | 10.5 | 10.2 | 10.5 | 10.5 | 10.7 | 10.8 | 10.9 |

TABLE 5

| | Comparative Example No. | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Molding Step | Bead Internal Pressure in Pre-pressurization | MPa(G) | 0.15 | — | — | 0.15 | — | — | — | — | — |
| | Cracking Width | % | 10 | 20 | 20 | 10 | 20 | 20 | 20 | 20 | 20 |
| | Molding Pressure | MPa(G) | 0.28 | 0.22 | 0.22 | 0.22 | 0.28 | 0.22 | 0.22 | 0.32 | 0.22 |
| | Water Cooling Time | Seconds | 100 | 0 | 0 | 0 | 5 | 0 | 0 | 0 | 0 |
| Molded Article | Open Cell Content | % | 0.4 | 35.8 | 5.1 | 0.9 | 4.1 | 4.2 | 2.1 | 5.1 | 15.0 |
| | Density of Molded Article | kg/m³ | 30 | 28 | 34 | 30 | 34 | 34 | 31 | 31 | 33 |
| | Voidage | % | 5.4 | 47.2 | 12.5 | 6.5 | 10.1 | 11.5 | 5.0 | 12.0 | 21.0 |
| | Evaluation of Appearance | — | A | C | A | A | A | A | A | A | C |
| | Compressive Stress of 50% | kPa | 231 | 151 | 210 | 205 | 240 | 230 | 221 | 246 | 205 |
| | Density (compression) of Cut-out Molded Article | kg/m³ | 29 | 28 | 33 | 29 | 33 | 33 | 30 | 30 | 30 |
| | Maximum Bending Strength S | kPa | 326 | 201 | 270 | 289 | 355 | 340 | 315 | 348 | 260 |
| | Density (bending) of Cut-out Molded Article DE | kg/m³ | 29 | 28 | 33 | 29 | 33 | 33 | 30 | 30 | 30 |
| | S/DE | kPa · m³/kg | 11.1 | 7.1 | 8.2 | 10.0 | 10.8 | 10.3 | 10.5 | 11.7 | 8.7 |

(Pre-Pressurization Step)

In a case where the pre-pressurization step was performed before the molding of the expanded beads, the pre-pressurization was performed by placing the expanded beads in the sealed container, pressurizing the expanded beads with compressed air, and applying the internal pressure shown in Table 5 to the expanded beads in advance. Note that, the internal pressure of the expanded beads is a value measured as follows. Internal pressure P (MPa (G)) of the expanded beads was calculated by a formula P=(W/M)×R×T÷V, where Q (g) was the weight of the expanded bead group in a state where the internal pressure was increased immediately before filling into the mold, U (g) was the weight of the expanded bead group after a lapse of 48 hours, and a difference between the weight Q (g) and U (g) was an increased air amount W (g). However, in the formula, M represents a molecular weight of air, R represents a gas constant, T represents an absolute temperature, V represents a volume (L) obtained by subtracting a volume of the base material resin in the expanded bead group from an apparent volume of the expanded bead group, and in this example, M=28.8 (g/mol), R=0.0083 (MPa·L/(K·mol)), and T=296 (K).

Note that, in a case where the pre-pressurization step was not performed, a symbol "-" was displayed in a bead internal pressure column in the table. In this case, the bead internal pressure is 0 MPaG (that is, the internal pressure is equal to an atmospheric pressure).

(Open Cell Content)

Open cell content (that is, the corrected open cell content) was measured according to ASTM 2856-70 Procedure B. As the measuring device, the dry automatic densitometer (specifically, AccuPyc II 1340 manufactured by Shimadzu Corporation) was used. To start with, the state of the molded article was adjusted by allowing the molded article to stand at 23° C. for 12 hours. Next, the first test piece having a cubic shape of 2.5 cm in length×2.5 cm in width×2.5 cm in height was cut out from the central portion of the molded article, and its geometric volume Va [unit: cm³] was measured. Specifically, Va is a value obtained by vertical dimension [cm]×horizontal dimension [cm]×height dimension [cm]. A true volume value V1 [unit: cm³] of the first test piece was measured with the dry automatic densitometer. Next, the first test piece was divided into 8 equal parts to obtain a cubic second test piece having a size of 1.25 cm in length×1.25 cm in width×1.25 cm in height. Next, a true volume value V2 [unit: cm³] of the second test piece was measured with the dry automatic densitometer. Note that, the true volume V2 of the second test piece is a total value of the true volumes of the eight pieces cut out from the first test piece. The open cell content Co [unit:%] is calculated by the following formula (7). Five first test pieces were cut out from the molded article, the open cell content was calculated by the above method, and the arithmetic average value thereof was used as a result.

$$Co = (Va - 2V1 + V2) \times 100/Va \tag{7}$$

(Density of Molded Article)

The density (kg/m³) of the molded article was calculated by dividing the weight (g) of the molded article by the volume (L) obtained from the outer dimension of the molded article and converting the value into a unit.

(Evaluation of Appearance)

Evaluation was performed based on the following criteria.

A: The molded article has a good surface state in which the inter-bead voids are small on the surface of the molded article and irregularities caused by the through-holes and the like are not noticeable.

B: The irregularities due to the inter-bead voids and/or the through-holes, and the like are slightly observed on the surface of the molded article.

C: The irregularities due to the inter-bead voids and/or the through-holes, and the like are remarkably observed on the surface of the molded article.

(Compressive Stress of 50%)

The test piece of 50 mm in length×50 mm in width×25 mm in thickness was cut out from the central portion of the molded article so that a skin layer of the molded article was not included in the test piece. According to JIS K 6767:1999, a compression test was performed at a compression rate of 10 mm/min to obtain 50% compressive stress of the molded article. Note that, the density of the test piece used for the measurement of the 50% compressive stress was obtained in the same manner as in the measurement of the density of the molded article, and the "density (compression) of the cut-out molded article" was shown in Table 4 and Table 5. Note that, the skin layer refers to a portion up to a depth of 5 mm from the surface in contact with the mold during the in-mold molding.

(Maximum Bending Strength)

The bending strength was measured in accordance with JIS K7221-2:2006, and a maximum point of the bending strength of the molded article was measured as the maximum bending strength. Specifically, a test piece of 120 mm in length, 25 mm in width, and 20 mm in thickness was cut out from the molded article so as not to include the skin layer. Using this test piece, the maximum bending strength was measured according to JIS K7221-2:2006 except that a lowering speed of a pressurizing wedge was set to 10 mm/min, the distance between the support points was set to 100 mm, a radius of a tip of the support table was set to 5 mm, and a radius of a tip of the pressurizing wedge was set to 5 mm. Note that, the density of the test piece used for the measurement of the maximum bending strength was obtained in the same manner as in the measurement of the density of the molded article, and the "density (bending) of the cut-out molded article" was shown in Table 4 and Table 5.

(Voidage of Molded Article)

The voidage of the molded article was obtained as follows. The test piece having a rectangular parallelepiped shape (20 mm in length×100 mm in width×20 mm in height) was cut out from the central portion of the molded article. The test piece was immersed in the measuring cylinder containing ethanol, and the true volume Vc [L] of the test piece was obtained from the amount of increase in the liquid level of ethanol. In addition, the apparent volume Vd [L] was obtained from the outer dimension of the test piece. The voidage of the molded article was obtained from the obtained true volume Vc and the apparent volume Vd by the following formula (8).

$$\text{Voidage (\%)} = [(Vd - Vc)/Vd] \times 100 \qquad (8)$$

Hereinafter, a method for producing expanded beads and a molded article in Examples 1 to 8 and Comparative Examples 1 to 9 will be described.

Example 1

<Production of Polypropylene-Based Expanded Beads>

PP1 shown in Table 1 was melt-kneaded at a maximum set temperature of 245° C. in the extruder for forming the core layer to obtain a resin melt-kneaded product. Note that, PP1 is an ethylene-propylene copolymer and has an ethylene component content of 3.1% by mass. Characteristics of PP1 are shown in Table 1. In addition, PP7 shown in Table 1 was melt-kneaded at a maximum set temperature of 245° C. in an extruder for forming the fusion-bondable layer to obtain the resin melt-kneaded product. Next, the respective resin melt-kneaded products were extruded from the extruder for forming the core layer and the extruder for forming the fusion-bondable layer from the tip of a coextrusion die having a small hole for forming the through-hole. At this time, the respective resin melt-kneaded products were joined in a die to form the sheath-core composite including the cylindrical core layer in the non-foamed state and the fusion-bondable layer in the non-foamed state covering the outer surface of the cylindrical core layer. The composite was extruded from pores of the spinneret attached to the tip of the extruder into the strand having a tubular shape with the through-hole, and the strand was water-cooled with cold water having a water temperature adjusted to 10° C. while the strand was taken up, and then cut with the pelletizer so that a mass was about 1.5 mg each. In this way, the multilayer resin particles each composed of the cylindrical core layer having the through-hole and the fusion-bondable layer covering the core layer were obtained. The mass ratio of the core layer and the fusion-bondable layer in the multilayer resin particle was set to core layer:fusion-bondable layer=95:5 (that is, the mass ratio of the fusion-bondable layer is 5%). Note that, in the production of the multilayer resin particles, zinc borate as a cell adjusting agent was supplied to the extruder for forming the core layer, and 500 ppm by mass of zinc borate was contained in the polypropylene resin.

(First Expansion Step)

1 kg of the multilayer resin particles was put in a 5 L sealed container together with 3 L of water as the dispersion medium, and 0.3 parts by mass of kaolin as the dispersant and 0.004 parts by mass of a surfactant (sodium alkylbenzene sulfonate) were added to 100 parts by mass of the multilayer resin particles in the sealed container. Carbon dioxide as the blowing agent was added to the inside of the sealed container, the sealed container was then sealed, and the inside of the sealed container was heated to an expansion temperature of 150.1° C. while being stirred. The pressure inside the container (that is, an impregnation pressure and a carbon dioxide pressure) at this time was 2.6 MPa (G). After holding at the same temperature (that is, 150.1° C.) for 15 minutes, container contents were released to the atmospheric pressure to obtain the expanded beads. The expanded beads were dried at 23° C. for 24 hours. In this way, expanded beads having a bulk ratio of 19.1 were obtained.

(Second Expansion Step)

Subsequently, the expanded beads were placed in a pressure-resistant container (specifically, a metal drum), and air was pressed into the pressure-resistant container to increase the pressure in the container, and the air was impregnated into the cells to increase the internal pressure of the cells in the expanded beads. Next, steam was supplied to the expanded beads (first-step expanded beads) taken out from the pressure-resistant container so that a pressure (that is, a drum pressure) in the pressure-resistant container was a pressure shown in Table 2, and the expanded beads were heated under the atmospheric pressure. The pressures (that is, the internal pressures) in the cells in the first-step expanded beads taken out from the pressure-resistant container were values shown in Table 2. As described above, the apparent density of the first-step expanded beads was reduced to obtain expanded beads (second-step expanded beads) having a bulk ratio of 37.5 times.

<Production of Molded Article>

In the production of the molded article, the expanded beads dried at 23° C. for 24 hours were used. Next, an exhaust step was performed in which the expanded beads were filled in a flat-plate mold of 300 mm in length×250 mm in width×60 mm in thickness and the crack amount was adjusted to 20% (that is, 12 mm), the metal die was clamped, and steam was supplied from both surfaces of the metal die for 5 seconds to preheat the mold. Thereafter, steam was supplied from one surface side of the metal die to perform one-side heating until a pressure lower than a predetermined molding pressure by 0.08 MPa (G) was reached. Next, steam was supplied from the other surface side of the metal die until a pressure lower than the molding pressure by 0.04 MPa (G) was reached to perform the one-side heating, and then heating (that is, main heating) was performed until the predetermined molding pressure was reached. After completion of the heating, the pressure was released, and the molded article was cooled with water until the surface pressure by an expanding force of the molded article reached 0.04 MPa (G), and then demolded to obtain the molded article. Note that, incidentally, the predetermined molding pressure was set as a value at which the molding pressure is the lowest among the molding pressures at which the acceptable product can be acquired in the evaluation of the fusion-bondability in the non-aging molding described above.

Example 2

This example is an example of expanded beads in which the mass ratio of the fusion-bondable layer is increased. Specifically, first-step expanded beads having a bulk ratio of 19.1 times were obtained in the same manner as in Example 1 except that the mass ratio of the fusion-bondable layer and expansion conditions were changed to the values shown in Table 2. Using the first-step expanded beads, a second expansion step was performed in the same manner as in Example 1 to produce second-step expanded beads having a bulk ratio of 37.5 times. In addition, a molded article was obtained in the same manner as in Example 1 using the second-step expanded beads.

Example 3

This example is an example in which a molded article was prepared using the first-step expanded beads. Specifically, expanded beads (that is, the first-step expanded beads) were produced in the same manner as in Example 1 except that in the first expansion step, the expansion conditions were changed as shown in Table 2, and expanded beads having a bulk ratio of 38.3 times were produced. The second expansion step is not performed. In addition, the molded article was obtained in the same manner as in Example 1 using the first-step expanded beads.

Example 4

This example is an example of producing expanded beads having the foamed core layer constituted by a mixed resin of two kinds of polypropylene-based resins. Specifically, first-step expanded beads having a bulk ratio of 18.5 times were obtained in the same manner as in Example 1 except that a mixed resin PP5 of PP1 and PP3 (a mass ratio of PP1:PP3=80%: 20%) shown in Table 1 was used as the polypropylene-based resin for forming the foamed core layer and the expansion conditions were changed to the values shown in Table 2. Using the first-step expanded beads, the second expansion step was performed in the same manner as in Example 1 to produce second-step expanded beads having a bulk ratio of 37.7 times. In addition, a molded article was obtained in the same manner as in Example 1 using the second-step expanded beads.

Example 5

This example is an example of expanded beads containing a black colorant. Specifically, black multilayer resin particles were prepared in the same manner as in Example 1 except that in the step of producing the multilayer resin particles, 2.7% by weight of carbon black was respectively added to each of the core layer and the fusion-bondable layer with respect to 100% by weight of the polypropylene-based resin. In addition, expanded beads (that is, the first-step expanded beads) were produced in the same manner as in Example 1 except that the multilayer resin particles were used, the expansion conditions were changed as shown in Table 2, and the multilayer resin particles were expanded at a bulk ratio of 36.7 times. The second expansion step is not performed. In addition, the molded article was obtained in the same manner as in Example I using the first-step expanded beads.

Example 6

This example is an example of expanded beads in which the mass ratio of the fusion-bondable layer is reduced. Specifically, first-step expanded beads having a bulk ratio of 18.9 times were obtained in the same manner as in Example 1 except that the mass ratio of the fusion-bondable layer and the expansion conditions were changed to the values shown in Table 2. Using the first-step expanded beads, the second expansion step was performed in the same manner as in Example 1 to produce second-step expanded beads having a bulk ratio of 37.7 times. In addition, using the second-step expanded beads, the molded article was obtained in the same manner as in Example 1.

Example 7

This example is an example of producing expanded beads having the foamed core layer constituted by a mixed resin of two kinds of polypropylene-based resins. Specifically, first-step expanded beads having a bulk ratio of 19.1 times were obtained in the same manner as in Example 1 except that a mixed resin PP6 of PP1 and PP3 (a mass ratio of PP1:PP3=95%: 5%) was used as the polypropylene-based resin for forming the foamed core layer and the expansion conditions were changed to the values shown in Table 2. Using the first-step expanded beads, a second expansion step was performed in the same manner as in Example 1 to produce second-step expanded beads having a bulk ratio of 37.5 times. In addition, using the second-step expanded beads, the molded article was obtained in the same manner as in Example 1.

Example 8

In this example, a molded article was obtained in the same manner as in Example 1 except that, in the molding step, pre-pressurization were performed so that the internal pressure of the expanded beads before filling into the mold was the value shown in Table 4, and the cracking width was changed to the value shown in Table 4.

Comparative Example 1

This example is an example of expanded beads having no through-holes. Specifically, expanded beads having a bulk ratio of 17.0 times were obtained in the same manner as in Example 1 except that resin particles each having no through-hole were produced during producing the multilayer resin particles, and the expansion temperature and the carbon dioxide pressure were changed to the values shown in Table 3. Using the first-step expanded beads, the second expansion step was performed in the same manner as in Example 1 to produce second-step expanded beads having a bulk ratio of 35.7 times. In addition, a molded article was obtained in the same manner as in Example 1 except that pre-pressurization was performed during the molding and the molding pressure and the cracking width were changed to the values shown in Table 5. The internal pressure (that is, the bead internal pressure) of the expanded beads in the pre-pressurization is shown in Table 5. Note that, in this example, the expanded beads having no through-holes were subjected to pre-pressurization since the expanded beads had poor passage of steam during the molding, and therefore the appearance and rigidity of the molded article were significantly deteriorated in a case where the pre-pressurization was not performed.

Comparative Example 2

This example is an example of expanded beads in which the average hole diameter of through-holes is too large. Specifically, the multilayer resin particles were produced in the same manner as in Example 1 except that the hole diameter of the small hole for forming the through-holes was larger than that in the examples. The expanded beads were produced in the same manner as in Example 1 except that the multilayer resin particles were used, the expansion conditions in the first-step expansion step were changed to the values shown in Table 3, and the multilayer resin particles were expanded to a volume ratio of 45.0 times in the first expansion step without performing the second expansion step. Then, a molded article was obtained in the same manner as in Example 1 except that the expanded beads were used.

Comparative Example 3

This example is an example of producing a molded article using expanded beads having no fusion-bondable layer without performing the pre-pressurization. Specifically, in this example, first-step expanded beads having a bulk ratio of 19.5 times were prepared in the same manner as in Example 1 except that PP1 was extruded from one extruder to obtain resin particles having a single layer structure without using the extruder for forming the fusion-bondable layer. Using the first-step expanded beads, a second expansion step was performed in the same manner as in Example 1, and the molded article was further obtained in the same manner as in Example 1.

Comparative Example 4

This example is an example of producing a molded article using the expanded beads having no fusion-bondable layer and performing the pre-pressurization. Specifically, in this example, a molded article was obtained in the same manner as in Example 1 except that the expanded beads of Comparative Example 3 were used and the pre-pressurization was performed. The internal pressure (that is, the bead internal pressure) of the expanded beads in the pre-pressurization is shown in Table 5.

Comparative Example 5

This example is an example of producing a molded article using the expanded beads having no fusion-bondable layer and increasing the molding pressure. Specifically, in this example, the expanded beads of Comparative Example 3 were used, and a molded article was obtained in the same manner as in Example 1 except that the molding pressure was set to the value shown in Table 5.

Comparative Example 6

This example is an example of expanded beads in which the mass ratio of the fusion-bondable layer is too large. Specifically, first-step expanded beads having a bulk ratio of 19.3 times were obtained in the same manner as in Example 1 except that the mass ratio of the fusion-bondable layer and the expansion conditions were changed to the values shown in Table 3. Using the first-step expanded beads, the second expansion step was performed in the same manner as in Example 1 to produce the expanded beads (that is, the second-step expanded beads) having a bulk ratio of 38.3 times. Furthermore, a molded article was obtained in the same manner as in Example 1 except that the expanded beads were used.

Comparative Example 7

This example is an example of producing expanded beads having the foamed core layer constituted by polypropylene-based resin having an excessively low flexural modulus. Specifically, first-step expanded beads having a bulk ratio of 17.1 times were obtained in the same manner as in Example 1 except that PP2 shown in Table 1 was used as the polypropylene-based resin for forming the foamed core layer and the expansion conditions were changed to the values shown in Table 3. Using the first-step expanded beads, the second expansion step was performed in the same manner as in Example 1 except that pressure conditions were changed to the values shown in Table 3, thereby producing expanded beads (that is, the second-step expanded beads) having a bulk ratio of 40.0 times. Furthermore, a molded article was obtained in the same manner as in Example 1 except that the expanded beads were used.

Comparative Example 8

This example is an example in which expanded beads having a foamed core layer constituted by polypropylene-based resin having an excessively high flexural modulus and melting point were produced. Specifically, expanded beads (first-step expanded beads) having a bulk ratio of 34.6 times were produced in the same manner as in Example 1 except that PP4 shown in Table 1 was used as the polypropylene-based resin for forming the foamed core layer and the expansion conditions were changed to the values shown in Table 3. The second expansion step is not performed. Using the first-step expanded beads, a molded article was obtained in the same manner as in Example 1.

Comparative Example 9

This example is an example of expanded beads in which the average hole diameter of through-holes is too large. Specifically, the multilayer resin particles were produced in the same manner as in Example 1 except that the hole diameter of the small hole for forming the through-holes was larger than that in the examples. Using the multilayer resin particles, expanded beads (first-step expanded beads) having a bulk ratio of 36.7 times were produced in the same manner as in Example 1 except that the expansion conditions were changed to the values shown in Table 3. The second expansion step is not performed. Using the first-step expanded beads, a molded article was obtained in the same manner as in Example 1.

As understood from Table 2 and Table 4, according to the expanded beads of Example 1 to 8, in a case where the aging step is performed, a good molded article can be molded in a wide molding range from a low molding temperature to a high molding temperature. In addition, even when the aging step is omitted, the molded article of expanded beads that is lightweight, has a desired shape, and has excellent appearance and rigidity can be produced by the in-mold molding. In addition, in Example 1 to 8, even when the pre-pressurization is omitted, the molded article of expanded beads having a desired shape and excellent appearance and rigidity can be produced at a low molding temperature.

In addition, as understood from Table 3 and Table 5, in Comparative Example 1, since the expanded beads did not have the through-holes, the moldable range with aging was slightly narrow. In addition, in a case of omitting the aging step, the molded article was significantly shrunk and deformed (that is, the recoverability failed).

In Comparative Example 2, since the through-holes of the expanded beads were too large, the moldable range with aging was slightly narrow. In addition, the appearance of the molded article was significantly deteriorated. Furthermore, in Comparative Example 2, the compressive stress and the maximum bending strength of the molded article were low.

In Comparative Example 3, Comparative Example 4, and Comparative Example 5, the expanded beads do not have the fusion-bondable layer. In Comparative Example 3, when the expanded beads were molded at a molding pressure equivalent to that in the examples, the fusion-bondability was poor, and the maximum bending strength of the molded article was low. In addition, in Comparative Example 4, the maximum bending strength was improved as compared with Comparative Example 3 because the pre-pressurization was performed to improve the fusion-bondability, but in a case of omitting the aging step, the molded article was significantly deformed and shrunk. In Comparative Example 5, since the molding was performed by increasing the molding pressure in order to improve the fusion-bondability, the maximum bending strength was improved as compared with Comparative Example 3, but in a case of omitting the aging step, the significant deformation and shrinkage occurred in the molded article.

In Comparative Example 6, since the mass ratio of the fusion-bondable layer in the expanded beads was too large, the significant deformation and shrinkage occurred in the molded article in a case of omitting the aging step.

In Comparative Example 7, since the flexural modulus of the resin constituting the foamed core layer of the expanded beads was too small, in a case of omitting the aging step, the significant shrinkage or deformation occurred in the molded article.

In addition, in Comparative Example 8, since the flexural modulus and the melting point of the resin constituting the foamed core layer of the expanded beads were too large, it was necessary to significantly increase the molding pressure in order to sufficiently fusion-bond the expanded beads during the molding to obtain the molded article excellent in appearance and rigidity.

In Comparative Example 9, although the average hole diameter of the through-5 holes of the expanded beads was smaller than that in Comparative Example 2, the through-holes of the expanded beads were still too large, so that the moldable range with aging was slightly narrow. In addition, the appearance of the molded article was significantly deteriorated. Furthermore, in Comparative Example 9, the compressive stress and the maximum bending strength of the molded article were low.

The invention claimed is:

1. A polypropylene-based resin expanded bead having a tubular shape with a through-hole, comprising:
    a foamed core layer constituted by a polypropylene-based resin; and
    a fusion-bondable layer covering the foamed core layer, wherein
    an average hole diameter d of the through-hole in the expanded bead is less than 1 mm, and a ratio d/D of the average hole diameter d to an average outer diameter D of the expanded bead is 0.4 or less,
    a mass ratio of the foamed core layer and the fusion-bondable layer is foamed core layer:fusion-bondable layer=99.5:0.5 to 85:15, and
    the polypropylene-based resin constituting the foamed core layer has a flexural modulus of 800 MPa or more and less than 1200 MPa and a melting point Tmc of 150° C. or lower.

2. The polypropylene-based resin expanded bead according to claim 1, wherein a circularity of the through-hole is 0.90 or more in a cross-section of the expanded bead in a direction perpendicular to a penetration direction of the through-hole.

3. The polypropylene-based resin expanded bead according to claim 1, wherein a ratio of an apparent density to a bulk density of the expanded bead is 1.7 or more and 1.9 or less.

4. The polypropylene-based resin expanded bead according to claim 1, wherein an average outer diameter D of the expanded bead is 2 mm or more and 5 mm or less.

5. The polypropylene-based resin expanded bead according to claim 1, wherein an average wall thickness t of the expanded bead, which is represented by the following formula (I), is 1.2 mm or more and 2 mm or less:

average wall thickness $t$=(the average outer diameter $D$–the average hole diameter $d$)/2     (I).

6. The polypropylene-based resin expanded bead according to claim 1, wherein a closed cell content of the expanded bead is 90% or more.

7. The polypropylene-based resin expanded bead according to claim 1, wherein the fusion-bondable layer is constituted by a polyolefin-based resin, and a melting point of the polyolefin-based resin constituting the fusion-bonding layer is lower than a melting point of the polypropylene-based resin constituting the foamed core layer.

8. The polypropylene-based resin expanded bead according to claim 1, wherein an apparent density of the expanded bead is 10 kg/m³ or more and 100 kg/m³ or less.

9. A molded article of polypropylene-based resin expanded beads formed by in-mold molding the polypropylene-based resin expanded beads according to claim 1, wherein an open cell content of the molded article of expanded beads is 2.5% or more and 12% or less.

10. A method for producing a polypropylene-based resin expanded beads, comprising:
dispersing multilayer resin particles each having a tubular shape with a through-hole in a dispersion medium in a sealed container;
impregnating the multilayer resin particles dispersed in the dispersion medium with a blowing agent; and
producing expanded beads by expanding the multilayer resin particles containing the blowing agent, wherein
the multilayer resin particles each have a core layer constituted by a polypropylene-based resin and a fusion-bondable layer covering the core layer,
an average hole diameter dr of the through-holes in the multilayer resin particles is less than 0.25 mm, and a ratio dr/Dr of the average hole diameter dr to an average outer diameter Dr of the multilayer resin particles is 0.4 or less,
a mass ratio of the core layer and the fusion-bondable layer in the multilayer resin particles is core layer: fusion-bondable layer=99.5:0.5 to 85:15, and
the polypropylene-based resin constituting the core layer has a flexural modulus of 800 MPa or more and less than 1200 MPa, and a melting point Tmrc of 150° C. or lower.

* * * * *